March 20, 1934. J. H. ROBERTS 1,951,841
ROTARY SHEAR
Filed March 20, 1930 13 Sheets-Sheet 1
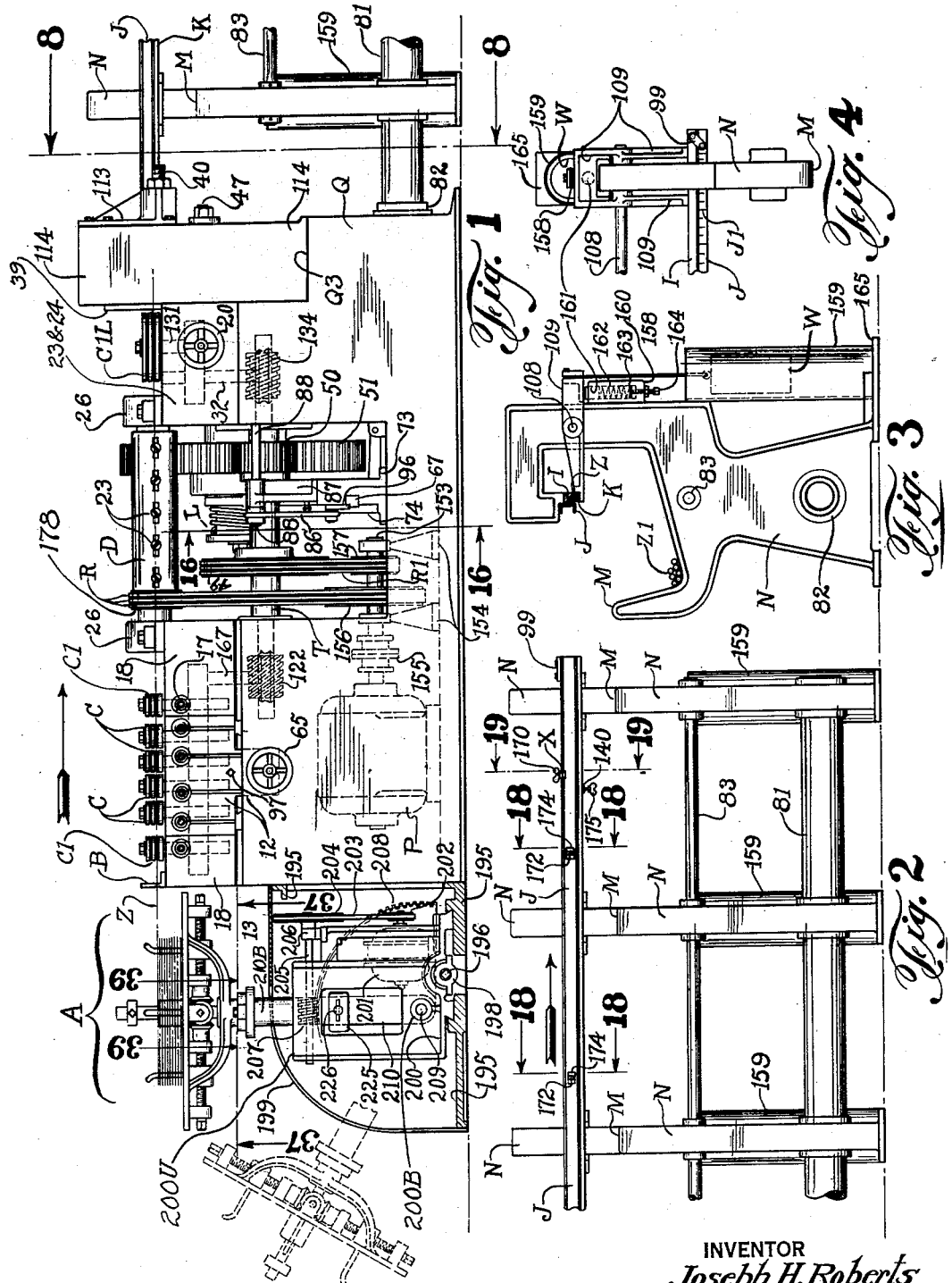
INVENTOR
Joseph H. Roberts
BY
Philip Farnsworth
ATTORNEY March 20, 1934.    J. H. ROBERTS    1,951,841
ROTARY SHEAR
Filed March 20, 1930    13 Sheets-Sheet 2
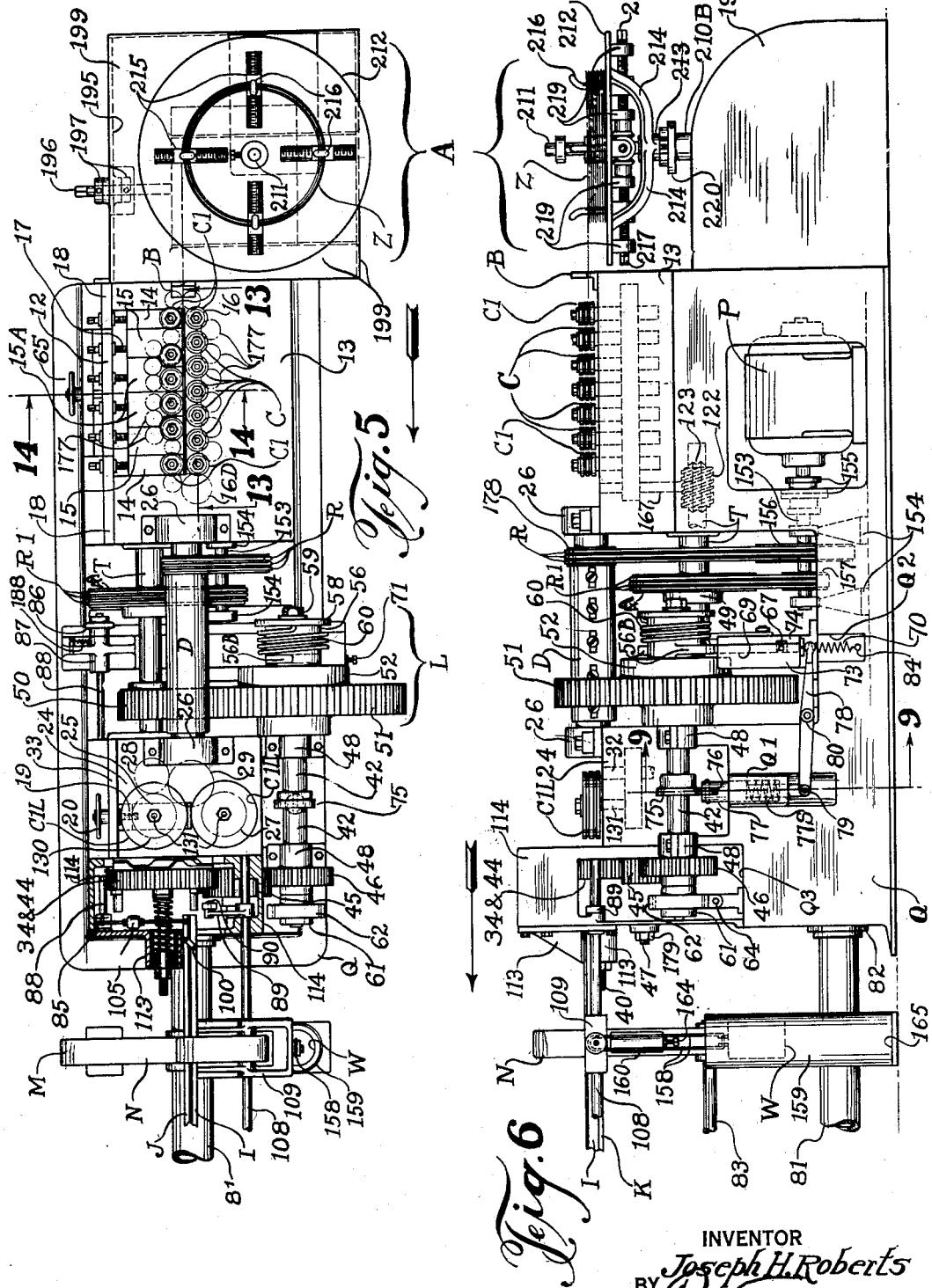
INVENTOR
Joseph H. Roberts
BY
Philip Farnsworth
ATTORNEY March 20, 1934.        J. H. ROBERTS         1,951,841
ROTARY SHEAR
Filed March 20, 1930        13 Sheets-Sheet 3
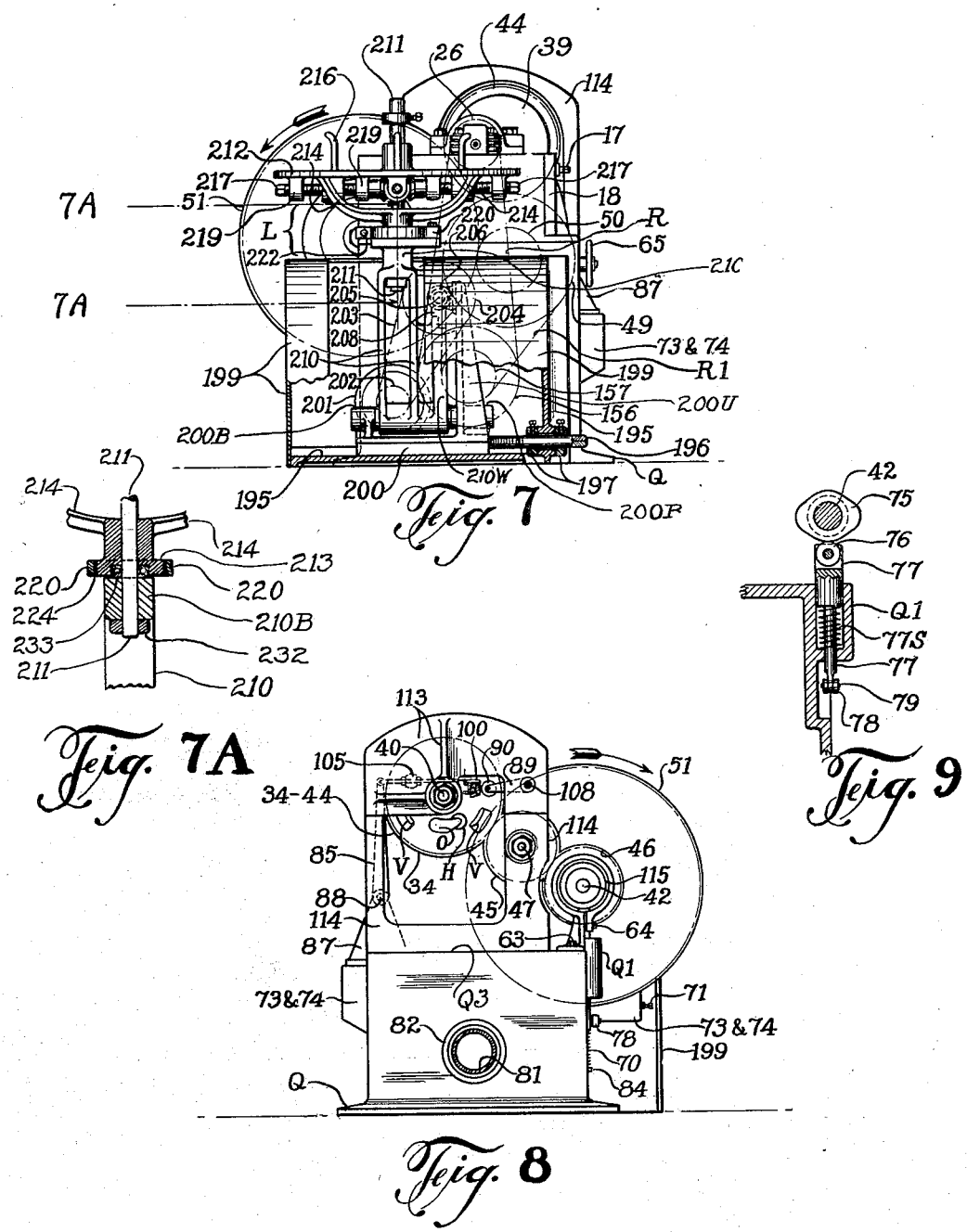
INVENTOR
Joseph H. Roberts.
BY
Philip Farnsworth
ATTORNEY

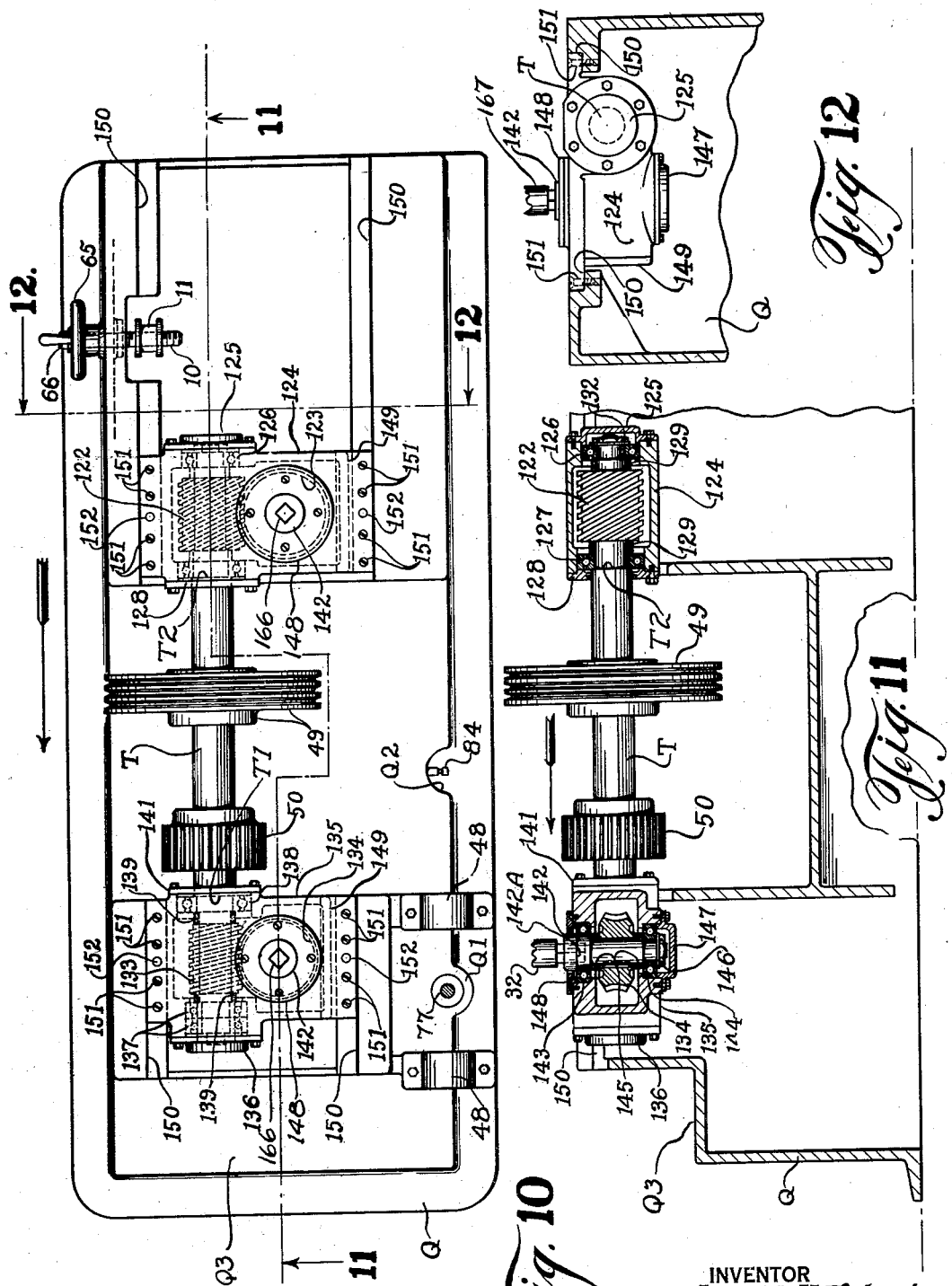

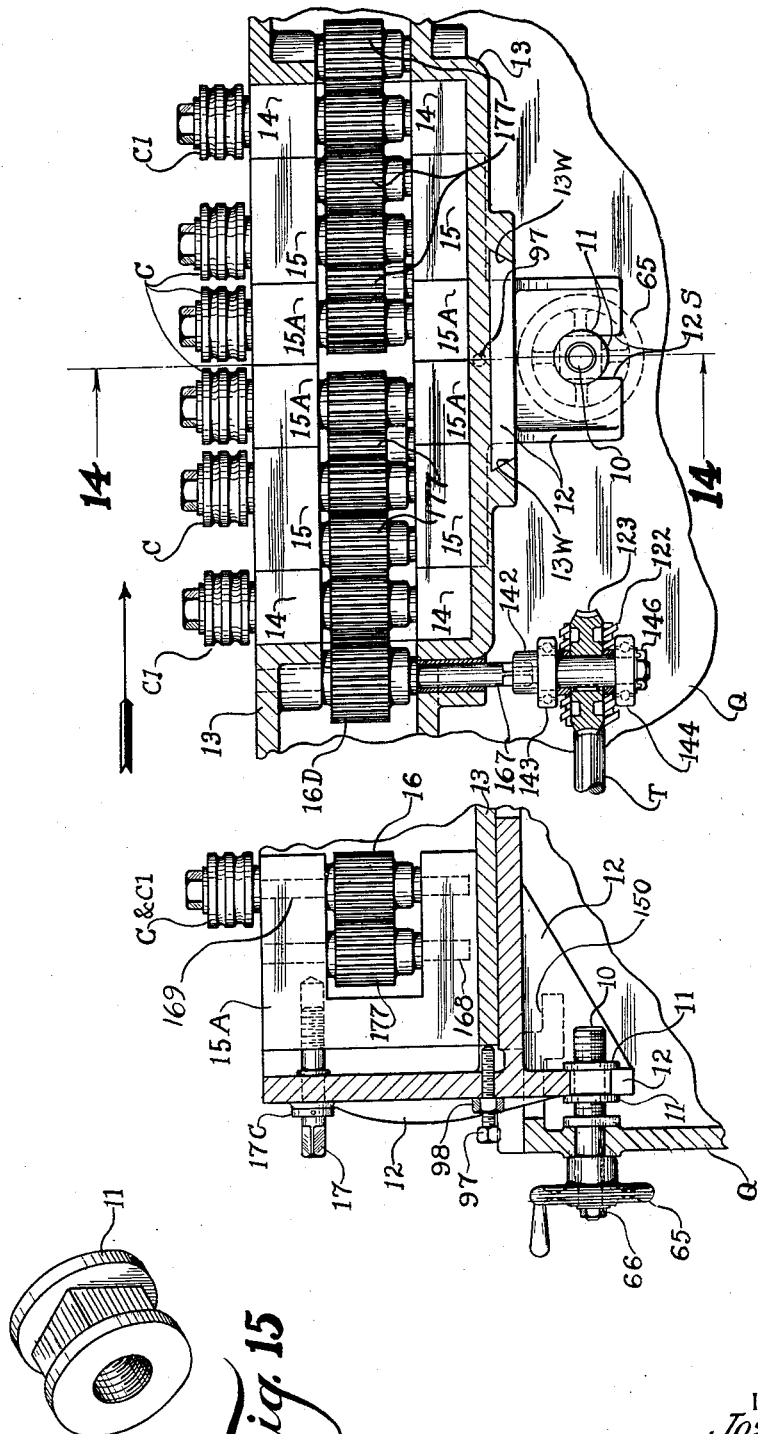

March 20, 1934. J. H. ROBERTS 1,951,841
ROTARY SHEAR
Filed March 20, 1930 13 Sheets-Sheet 6
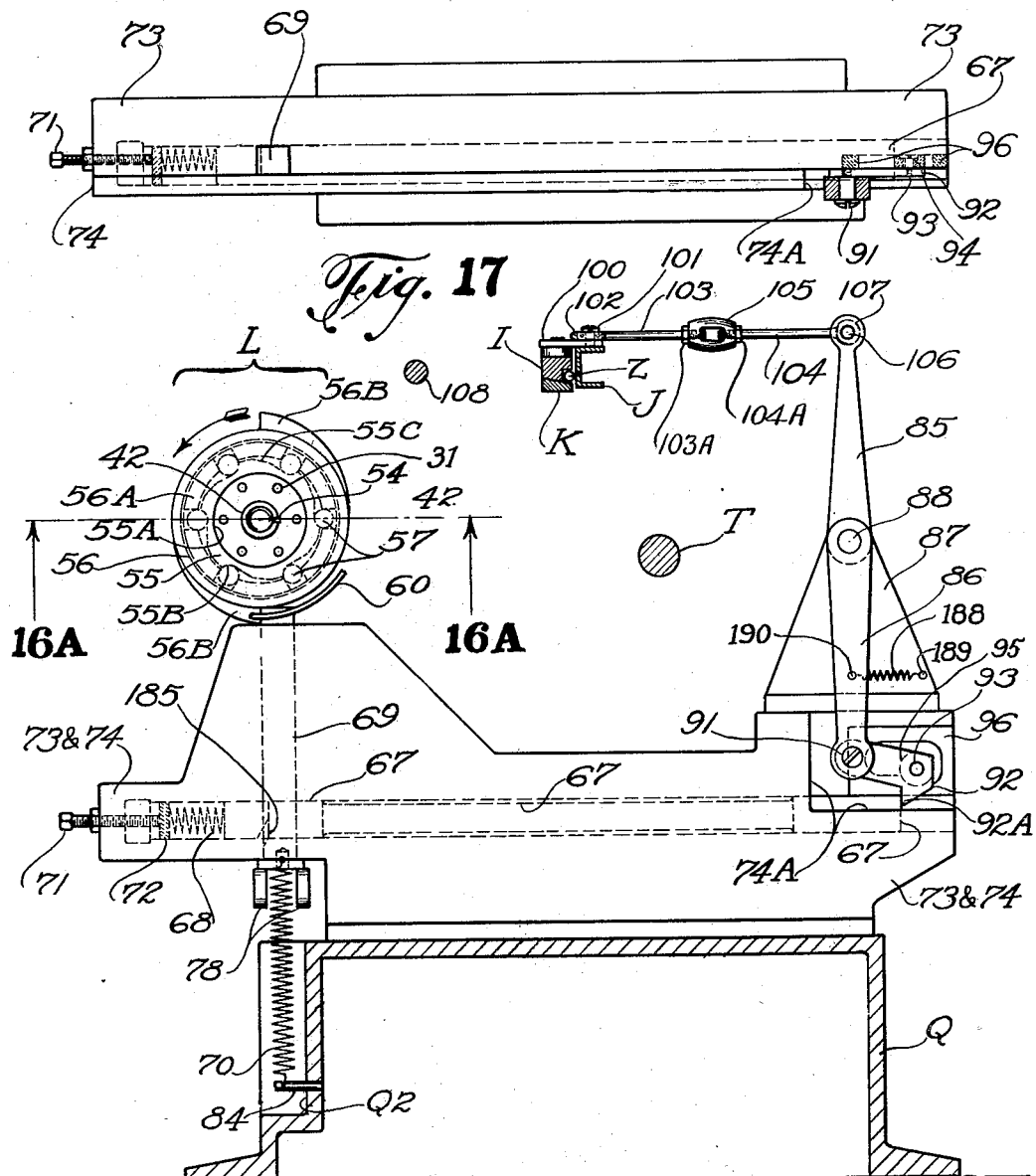
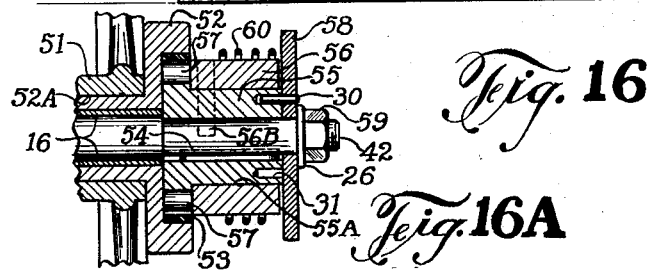
INVENTOR
Joseph H. Roberts
BY
Philip Farnsworth
ATTORNEY

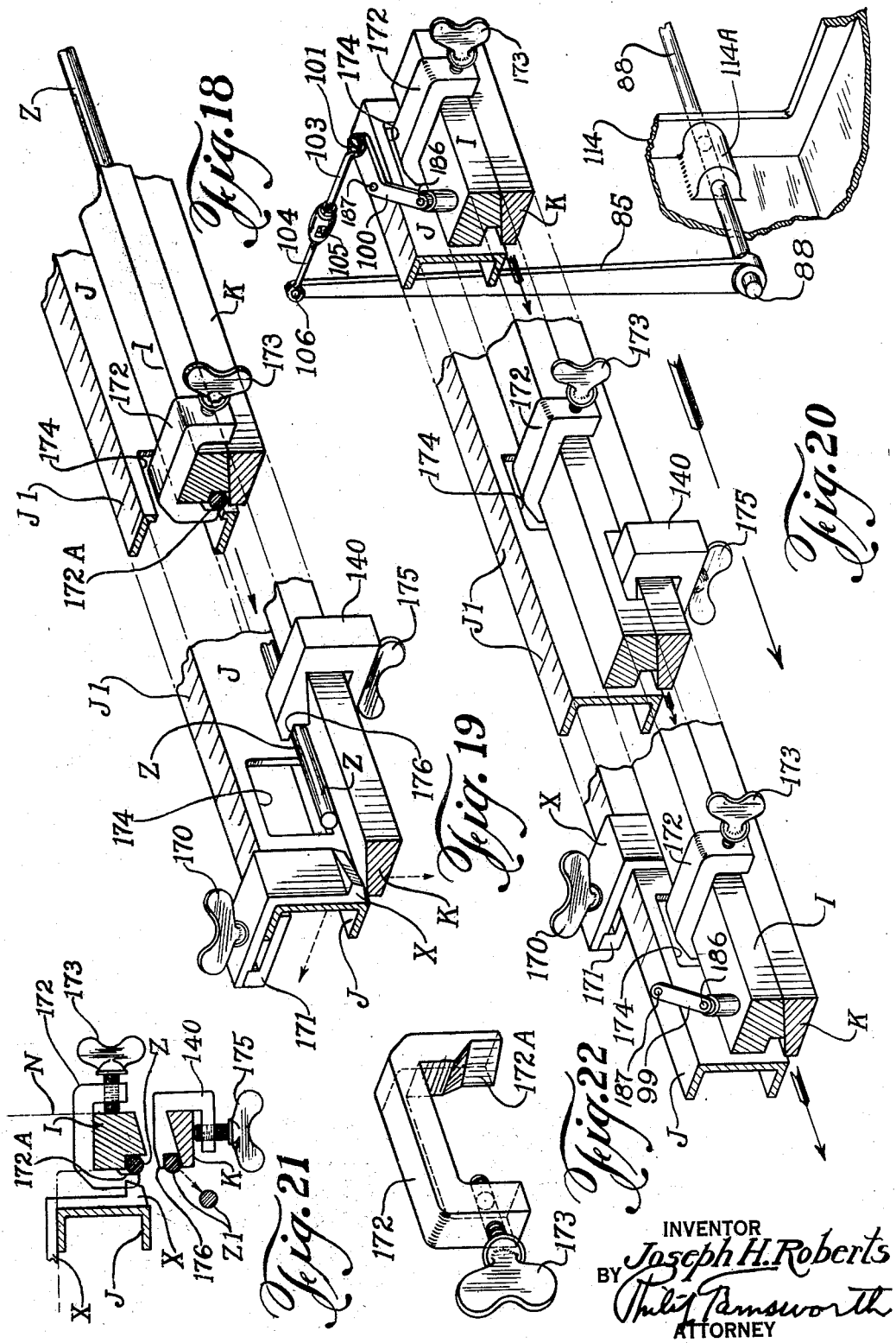

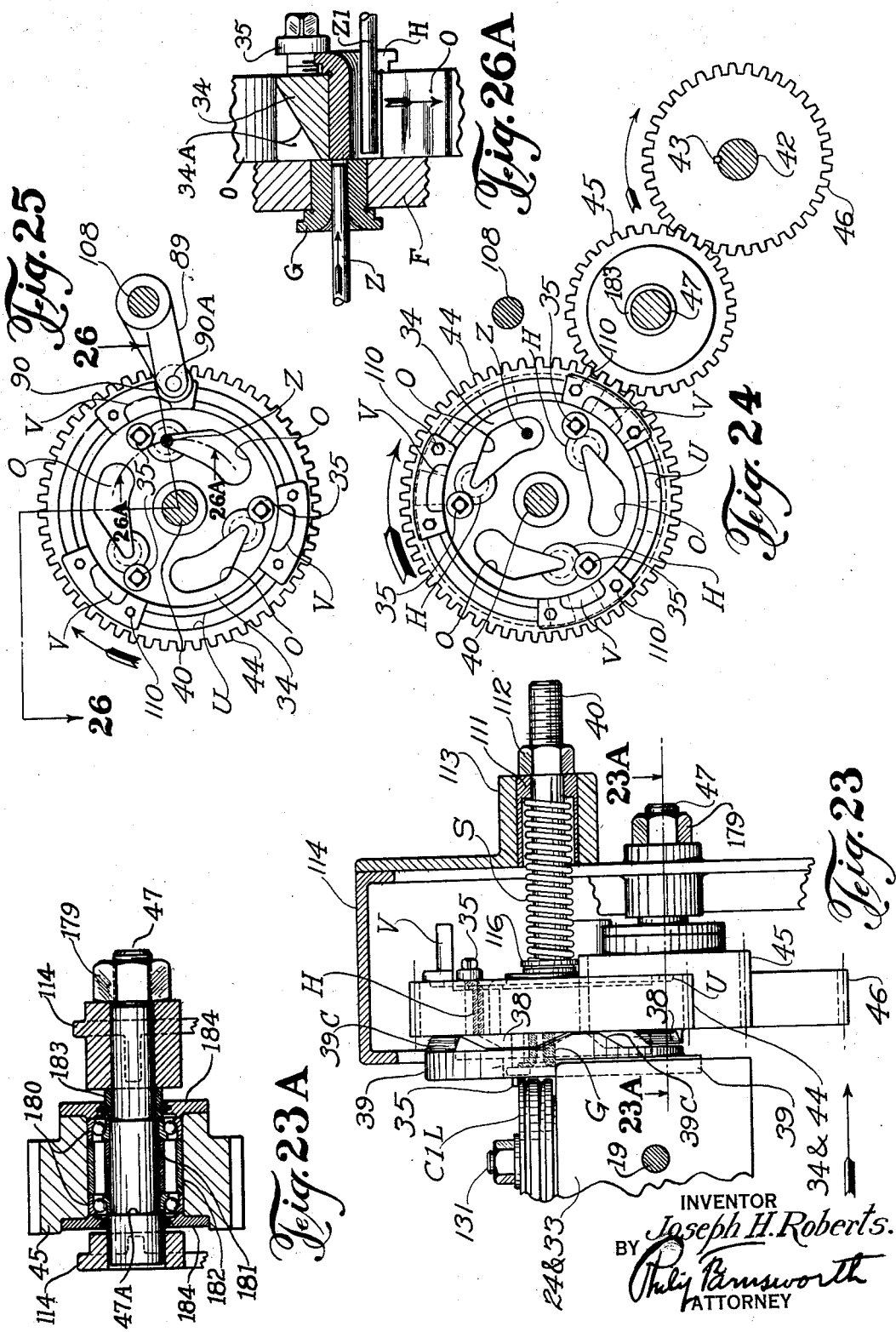

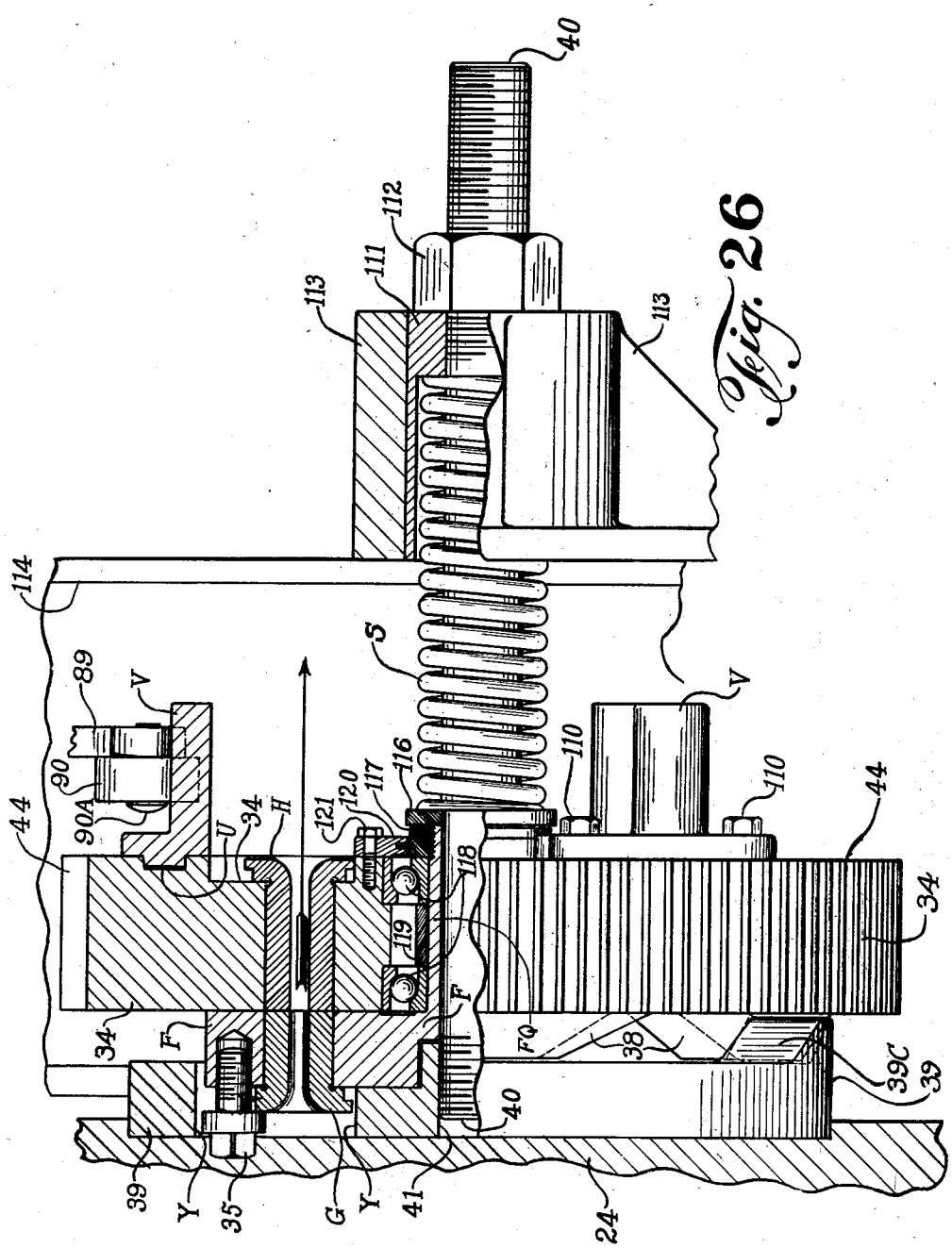

March 20, 1934.  J. H. ROBERTS  1,951,841
ROTARY SHEAR
Filed March 20, 1930   13 Sheets-Sheet 10
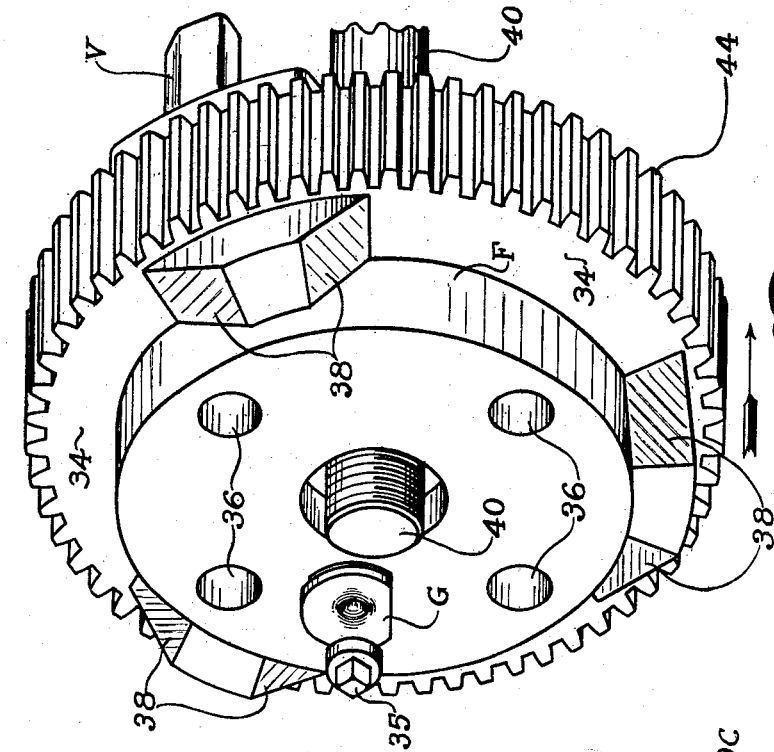
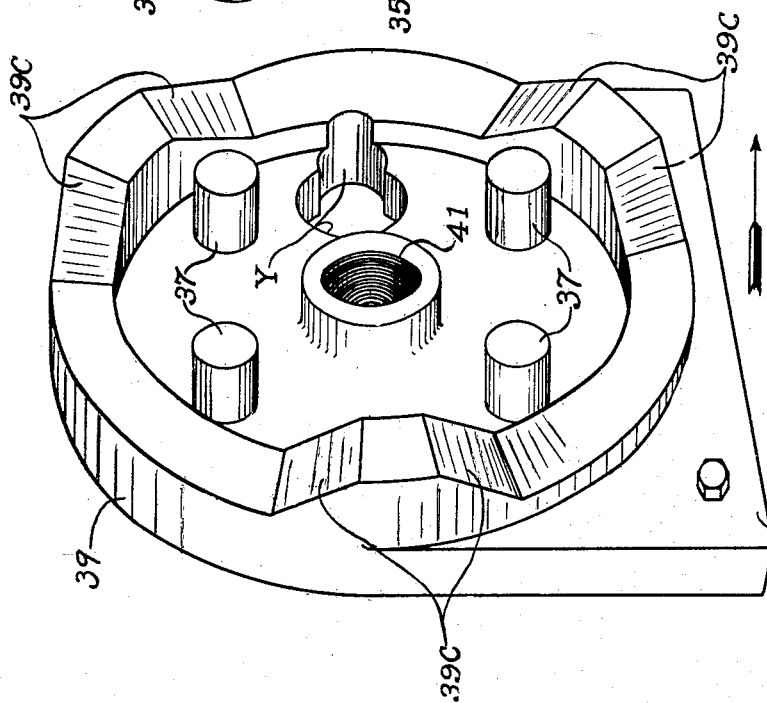
INVENTOR
Joseph H. Roberts
BY
Philip Farnsworth
ATTORNEY March 20, 1934.  J. H. ROBERTS  1,951,841
ROTARY SHEAR
Filed March 20, 1930  13 Sheets-Sheet 11
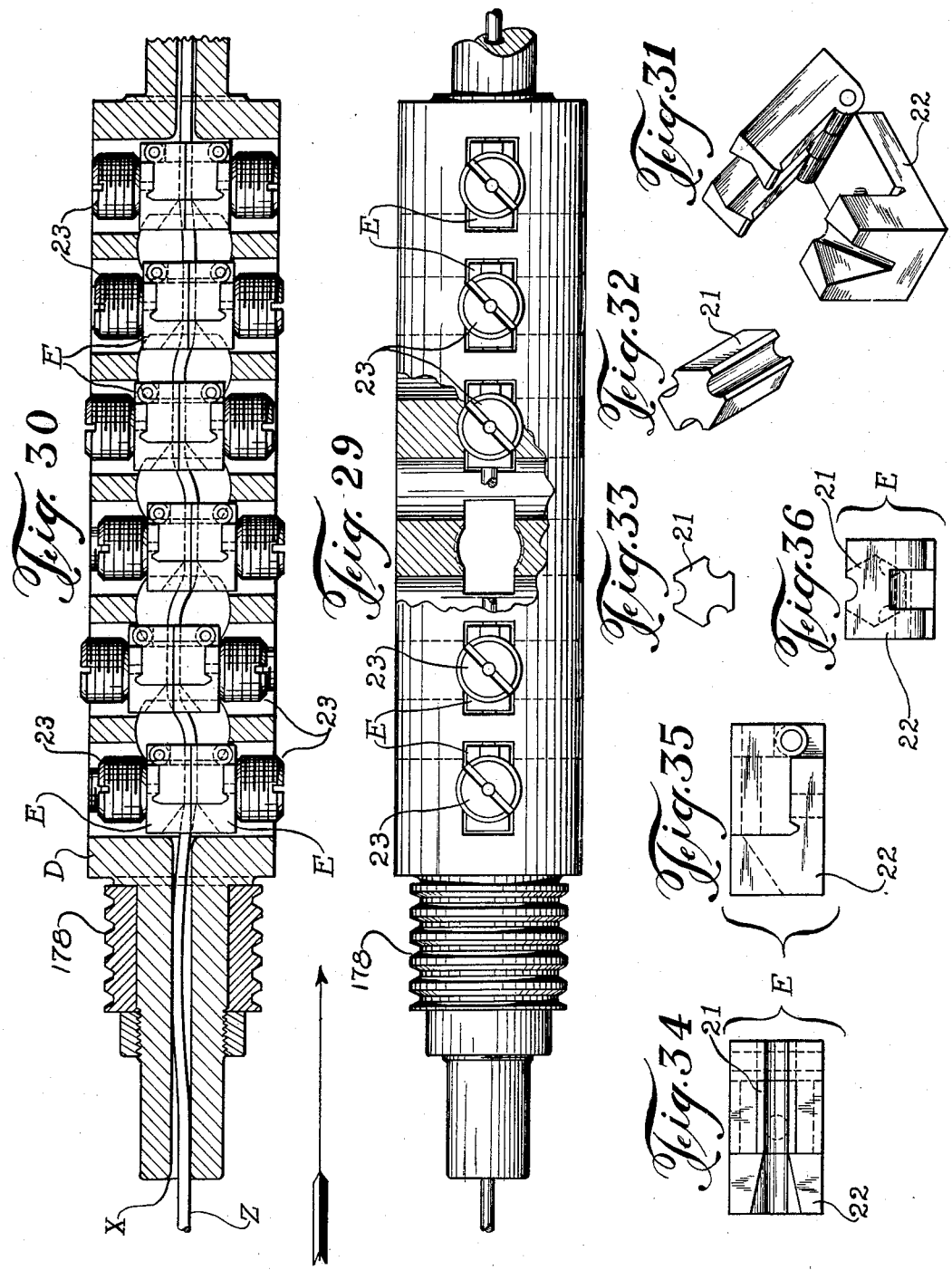

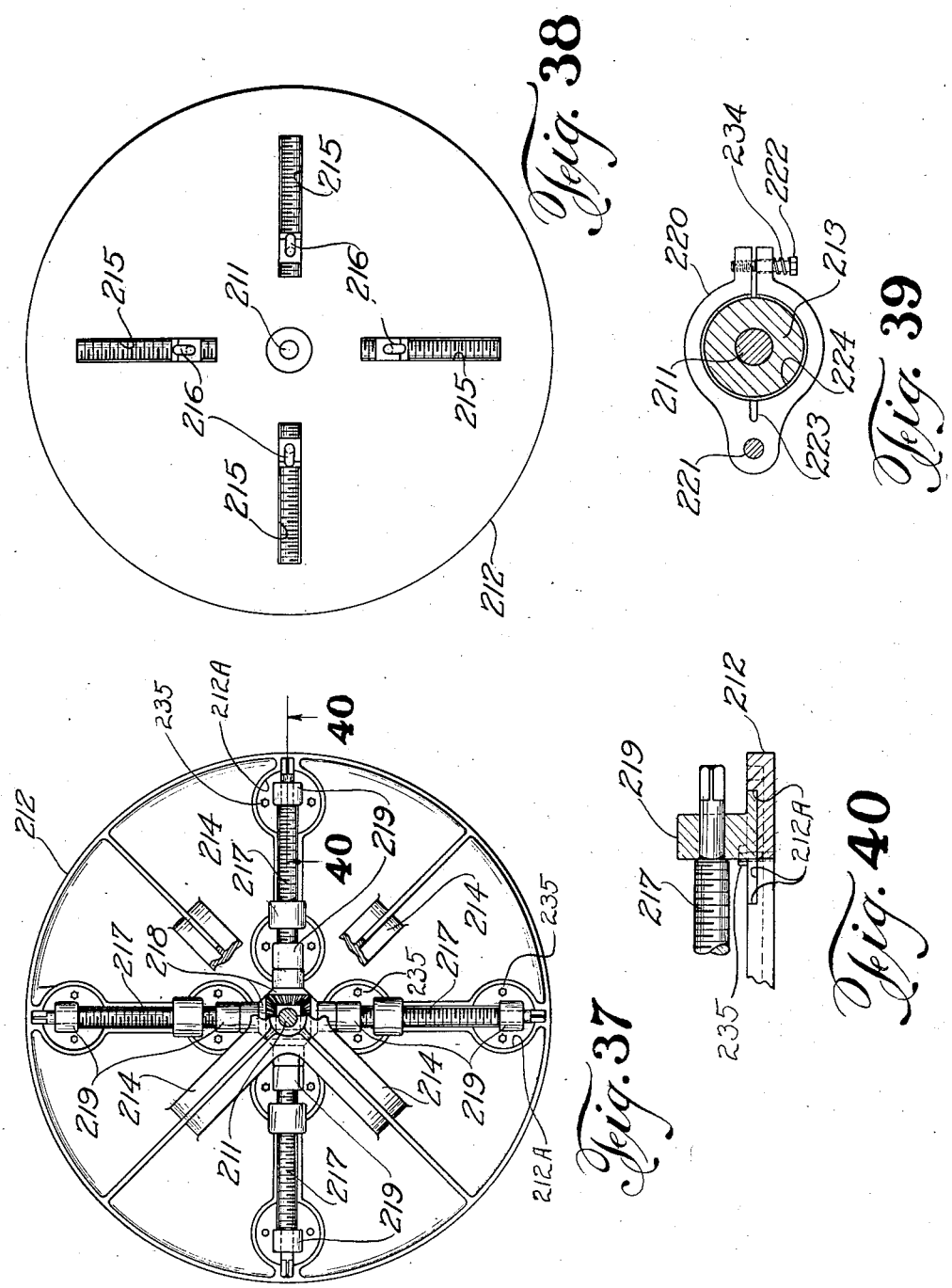

March 20, 1934.　　J. H. ROBERTS　　1,951,841
ROTARY SHEAR
Filed March 20, 1930　　13 Sheets-Sheet 13

INVENTOR
Joseph H. Roberts
BY
Philip Farnsworth
ATTORNEY

Patented Mar. 20, 1934

1,951,841

UNITED STATES PATENT OFFICE 1,951,841

ROTARY SHEAR

Joseph H. Roberts, Waterbury, Conn., assignor to F. B. Shuster Co., Inc., New Haven, Conn., a corporation Application March 20, 1930, Serial No. 437,305

64 Claims. (Cl. 140—143)

This invention relates to improvements in shearing machines for steel stock of greater length than breadth including more or less thick very long metal rod stock whether or not cylindrical as well as narrow flat strips of very long steel stock; the invention relating more particularly to the types including a shearing member which is rotated in a plane transversely of the stock and carries at least one shearing tool which it revolves in said plane to cooperate with a non-revolving tool to shear the long stock into relatively short sub-lengths; and the invention relates to other features which cooperate with said shearing tools to effect the object of insuring uniformity of length of the sheared sub-lengths.

An object of the invention is an efficient and reliably and accurately operating machine of the above general class or type, yet one which shall be as simple as may be and of low cost, and which will operate at a high production rate.

The invention consists of the construction and combination of apparatus and mechanism substantially as shown in the accompanying drawings of an exemplary machine in the form of a machine working for example on very long steel rods of greater or less thickness. Said rods as they come from the mill to the machine hereof being frequently hundreds of feet long in the form of a coil, are placed on a reel which is set up at an end of the machine whence the stock is fed longitudinally by the machine mechanism to the rotary shearing mechanism.

The feeding movement of the long stock is longitudinally of its length and always in the same direction but is shown as indicated by arrows from left to right in Figs. 1, 2, 13, 23, 23A, 26, 27, 28, 29, 30 and 42. But the movement of the stock is shown from right to left in Figs. 5, 6, 10, 11, 18, 19 and 20.

Fig. 1 is a front elevation of the left-hand portion of the machine proper with guard broken away exposing mechanism operating the stock reel;

Fig. 2 is a view of the right-hand extension from Fig. 1;

Fig. 3 is an elevation of the right or stock-discharge end of Fig. 2;

Fig. 4 is a plan of part of Figs. 2 and 3;

Fig. 5 is a plan of Fig. 1 reversed left and right;

Fig. 6 is a rear elevation of Fig. 6 (looking at rear of Fig. 1);

Fig. 7 is an end elevation of the left end of Fig. 1 and showing the braking mechanism for reel A also shown in Fig. 39;

Fig. 7A is an enlarged sectional view on line 7A—7A of Fig. 7, and showing said braking mechanism;

Fig. 8 is an end elevation of the right end of Fig. 1 partly in section on 8—8 and showing the driving of rotary shear 34 by fly-wheel gear 51 of the shear-clutch;

Fig. 9 is an enlarged view on line 9—9 of Fig. 6 showing re-latching mechanism for shear-clutch L;

Fig. 10 is a detail plan view of those parts of Fig. 6 which include the mounting of the main drive-shaft T and the right-angle drives to the two main feeding roll units by which the stock is fed rightward, i. e., Fig. 1, the roll-stand, C, C1 at left of flier D and the second feeding unit C1L at right of D;

Fig. 11 is a sectional elevation of Fig. 10 on line 11—11, Fig. 11 showing details not shown in the assembly rear elevation of Fig. 6;

Fig. 12 is a sectional end elevation of Fig. 10 on line 12—12;

Fig. 13 is an enlarged longitudinal vertical sectional elevation of the roll-stand on line 13—13 of Fig. 5, looking, Fig. 1, from the rear toward the front of the machine as a whole;

Fig. 14 is an enlarged transverse vertical section of Figs. 5 and 13 on lines 14—14 thereof, looking, Fig. 1, toward the left of the machine as a whole;

Fig. 15 is a perspective detail of part 11 of Figs. 13–14;

Fig. 16 is a diagrammatic transverse sectional elevation substantially on line 16—16 of Fig. 1 illustrating the roll-locking clutch L with its plate 58 removed; and the tripping linkage between the van of the stock Z and the clutch;

Fig. 16A is a longitudinal section of the clutch L on line 16A—16A of Fig. 16;

Fig. 17 is a plan of the clutch-tripping mechanism of Fig. 16;

Figure 41:
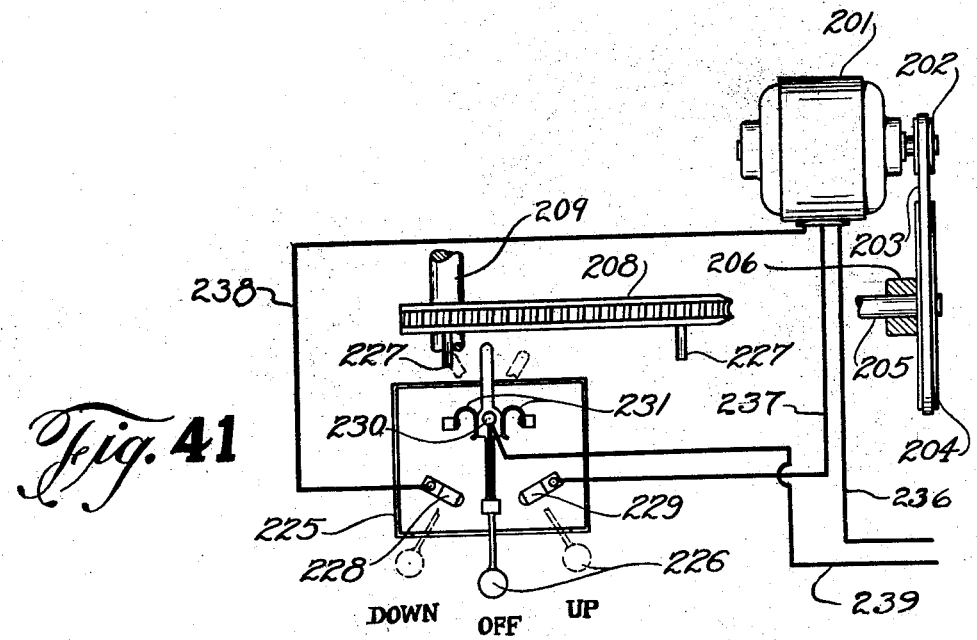
Figure 42:
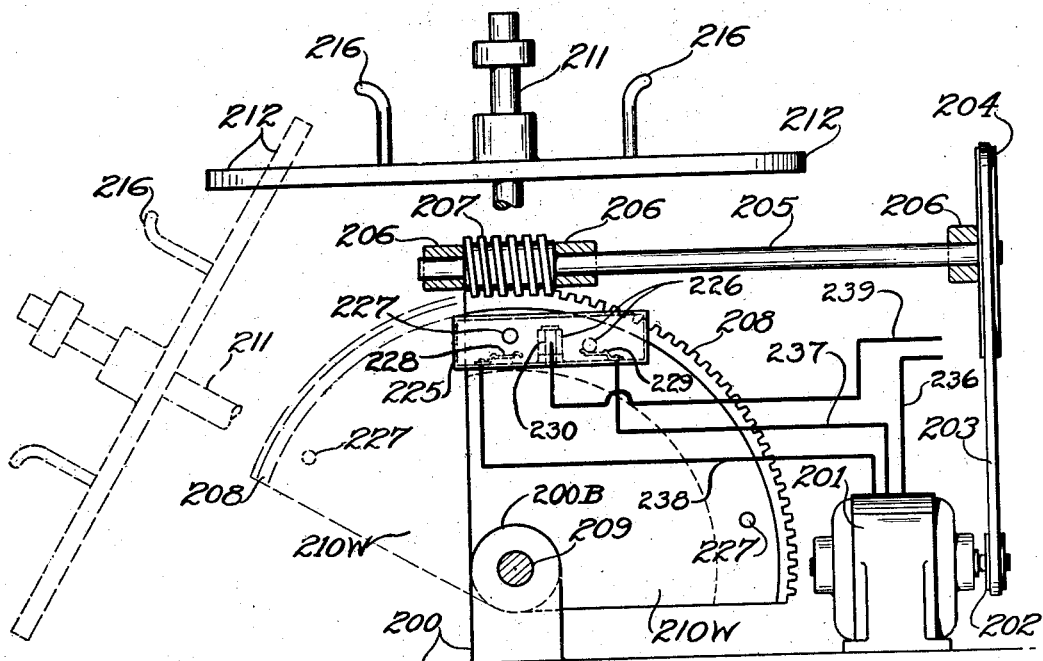

Fig. 18, top right, is a perspective view broken at right, sectioned at left from either of the two lines 18—18, Fig. 2, looking from rear and showing stock Z appearing to move right to left between stock-guides I, J, K of Fig. 16;

Fig. 19, top center, is a similar perspective broken at right but sectioned at 19—19, Fig. 2, but with stock-guide I omitted to show a van of stock Z about to strike target X which controls the linkage controlling clutch L, of Figs. 16, 16A;

Fig. 20, bottom left to right, is a perspective, broken, condensed and sectioned end illustrating the connection to movable stock-guide J of the target-tripped linkage of Fig. 16 which controls clutch L which intermittently drives the stock-shear;

Fig. 21 is a section of the stock-guides and stock of Figs. 18, 19 showing locations of the stock Z in its position of feeding toward target X of Fig. 18, and showing at Z1, Z1, respectively the sheared sub-length in its respective positions of partial gravity discharge and complete discharge from the machine; this figure also showing in elevation the several devices auxiliary to the stock-guides and cooperating with them in supporting and discharging the stock and in controlling the operation of the shearing mechanism;

Fig. 22 is a perspective view of one of the stock-holding devices of Figs. 18, 20;

Fig. 23 is a front elevation of rotary shear 39, 114, Fig. 1, upper right, on a larger scale and with the hood-casting 114 sectioned to show interior shear-parts; and only one of three cams V being shown, a second being hidden in rear and the third in front being omitted for clearness;

Fig. 23A is a sectional detail substantially on line 23A—23A of Fig. 23, and showing the constructions around shaft 47 of idler-gear 47 of Figs. 23—24;

Fig. 24 is a right end elevation of Fig. 23, omitting housing 114 and the parts at the right of rotary shear-carrier 34 in order to show the other parts thereof and the associated drive gears all in their normal stationary positions;

Fig. 25 is a view like Fig. 24 but showing rotary shear-carrier 34 in the midst of an operating cycle with one of the revolving dies H moving down and about to shear a relatively short sub-length from stock Z;

Fig. 26 is a front elevation (Fig. 1) of the shear-mechanism, this view being similar to Fig. 23 but further enlarged toward full scale and partially in longitudinal section of Fig. 25 at 26—26 to show one of the revolving dies H in its position of Fig. 25 when it has reached the stock and is about to shear it;

Fig. 26A is a longitudinal section in yet larger scale showing cooperating dies G, H and their carriers in their relative positions just after having sheared off a sub-length Z1;

Fig. 27 is an enlarged perspective detail of the stationary control member 39 for actuating rotary shear carrier 34 of Fig. 26A longitudinally during each of its successive rotary movements;

Fig. 28 is a perspective assembly of the rotary and reciprocatory shear-carrier 34 and adjacent reciprocatory carrier F and their associated parts which co-act with control member 39 of Fig. 27;

Fig. 29 is a sub-assembly view of the flier D shown (central top) in Figs. 1 and 6;

Fig. 30 is a longitudinal section of Fig. 29;

Figs. 31—36 are views of the parts in flier D; Fig. 31 being a perspective detail assembly of the die-holder opened to receive the die 21 of Fig. 32;

Fig. 32 being a perspective detail of the die 21; Fig. 33 being an end view of the die 21 of Fig. 32;

Fig. 34 being an assembly of the die and die-holder of Figs. 31—32; viewed from that side which contacts with the stock;

Fig. 35 being a side elevation of Fig. 34; and Fig. 36 being an end elevation of Figs. 34 and 35;

Fig. 37 is an enlarged sectional view of the stock-reel table from below on line 37—37 of Fig. 1;

Fig. 38 is a plan of said table of Fig. 37;

Fig. 39 is an enlarged sectional view of the reel A at 39—39 of Fig. 1 showing the reel brake also shown in Figs. 7-7A;

Fig. 40 is a section of Fig. 37 at 40—40;

Fig. 41 is a diagrammatic mechanical plan and an electric wiring diagram of the stock reel; and Fig. 42 is a front elevation of Fig. 41.

The following is a brief index of the operations, left to right Figs. 1-2, the operator facing the front and the various controls. The heavy coil or roll of long steel rod stock Z from the mill, and desired to be sheared into relatively short sub-lengths up to about a score of feet, is raised from the floor by power-reel A and when the stock coil is in its elevated position, full lines, Fig. 1, its van end is inserted by the operator thru guide B and into the first pair of power-operated pinch-feed rolls C1, Figs. 1, 5 and 6 whence it is power-fed continuously rightward, Figs. 1-2, as long as the machine is in operation, to the pairs of spaced and staggered feed-rolls C, Figs. 1, 5, and 6 thru pinch-rolls C1, Figs. 1, 5, and 6 thru flier D, thru auxiliary pull-push pinch-feed rolls C1L, thru the shearing mechanism 39, Fig. 1, etc. inside housing 114 to the longitudinal stock supports or guides and discharging means J, K, I, Figs. 1-3, 18-21. and discharging means J, K, I, Figs. 1-3, 18-21. Inside housing 114, Figs. 1, 23, 26, the shear Figs. 23-28, has a rotary member 34, Fig. 28 carrying three shearing-tools or hollow dies H, Figs. 24, 25, the interiors of which communicate with the circumferential stock-passages O, formed in said rotary member 34. The stock Z is fed by the successive continuously operating feed rolls to and thru the supporting and discharging guides J, K, Figs. 1-3, 18-21, and passes on the way to said guides thru one of said shear-openings O, Fig. 24 at an end thereof which is circumferentially remote from that hollow die H which is fixed at the other end of opening O and communicates therewith. At this time and during the preferably continuous feed of most of stock Z, the shearing mechanism is at rest and the stock is fed thru it and thru the space between guides I, J, K, Figs. 1-3, 21, on the way to target X, Fig. 2, which target is adjustably fixed to the guide J at a portion of the horizontal length thereof which determines the relatively short sub-length of stock Z1 which is to be sheared from the van of the long stock Z which is being pulled from reel A thru the machine to the shear and to the van-supporting and sheared sub-length discharging mechanism I, J, K. When the van end of the stock Z strikes target X it moves guide J and operates mechanism, Fig. 16, which causes clutch L, Figs. 16, 1, 5, 6 to start the rotary shear 34 in its one-third rotation from its normal position of rest Fig. 24, carrying that die H (which is fixed at the circumferentially rear end of that opening O thru which stock Z is passing) down against stock Z. Soon after shear 34 starts rotating it preferably, as disclosed, starts moving rightwardly with the stock, Figs. 1, 23, 26-28, together with another die-carrier F, Fig. 28, which moves only horizontally; both members 34 and F moving longitudinaly at the same rate as stock Z, and the open forward end of shear die H embracing the stock and striking it, Figs. 25, 26 effecting shearing off of sub-length Z1, Fig. 21. At about this time of shearing the rightward forward movement of the shear-mechanism causes, Fig. 21, downward movement of bottom stock-guide K, Fig. 22, resulting in gravity discharge of the just sheared sub-length Z1, Fig. 21. Meantime the shearing mechanism 34 has continued both to rotate and to move rightwardly at substantially the same rate as the main unsheared stock Z; and during that short time the forward wall, of the next one of the three shear-openings O and the communicating hollow die H move toward stock Z, Fig. 25. A braking mechanism is provided for shaft 42, Fig. 24, which has been operating the rotary member 34 of the shearing mechanism by the intermittent operation of clutch L, Fig. 16, on shaft 42, and as soon as said second opening O is rotated into a position, Fig. 24, in front of the new van end of stock Z, then clutch L stops driving said rotating shear member, the rotation of the latter is braked, and a spring S, Figs. 23, 26 returns the shear carriers and dies longitudinaly leftward to their normal positions of rest, during which leftward movement the stock Z passes rightward thru said second shear opening O, the stock thereafter continuing to pass thru said second opening while the shear mechanism remains in its normal position of rest and until the new stock-van reaches and gives another movement to target X and again starts the above operating cycle of the shear including its complete longitudinal reciprocation and its one-third rotation during its rightward longitudinal movement. But before the new van end of stock Z has entered far if at all between stock-guides I, J, K, the latter two have been returned automatically to their normal positions close together to form a supporting and guiding chamber for stock Z as its van is fed rightwardly toward target X. In the next or second shearing cycle, the above operations are repeated but this time with respect to said second opening O and second revolving die H adjacent said second opening; and in the next or third shearing cycle, it is the third die H adjacent the third opening O which acts to shear the stock with the cooperation of die G on carrier F. Thus clutch L at each cycle turns the rotary member 34 thru one-third of one complete rotation, and the stock-guides I, J, K serve alternately as supports for the van portion of long stock Z fed thru and beyond the shear, and as discharging means for the successively sheared sub-lengths Z1.

All of the foregoing mechanical components operate to feed the stock Z and produce sheared portions Z1 of uniform length; and all but reel A which is moved bodily by motor 201, are driven by a common driving means such as electric motor P, Fig. 1, by way of shafts all of which are arranged parallel with the line of stock-feed and extending longitudinally of the machine.

The motor P is located within the pedestal A and is connected to the short jack-shaft 153, Figs. 1 and 6, by the flexible coupling 155; said jack-shaft 153 being supported by the two bearing-stands 154, Figs. 1 and 6. The power received from motor P is transferred from jack-shaft 153 to the several operating components via multi-strand belts R—R1; i. e., to flier D by belts R from sheave-pulley 156 to pulley 178; and to main-shaft T by belts R1 from sheave-pulley 157 to pulley 49.

Flier D, Fig. 1 is of the construction clearly shown in Figs. 29-36 and is supported by anti-friction bearings within 26—26, Fig. 1.

Main-shaft T, front in Figs. 1, 11 rear in Figs. 6, 10, drives the feed-rolls C, C1 and C1L and the half-revolution clutch L. Shaft T is supported adjacent each of its ends by and within the worm-gear-unit housings 135 and 124, Figs. 10–12.

Worm-gear 122 in housing 124, Fig. 11 drives via spindle 167, Fig. 1, to the superimposed roll-stand comprising rolls C, C1, Figs. 13–14 and 1, 10. Worm-gear 134 in housing 135, Fig. 11 drives via spindle 32, Fig. 1, to the superimposed pinch-rolls C1L, Fig. 1.

The power drive from main-shaft T, Figs. 1, 5, 6, to the half-revolution clutch L for operating the shear 39, 114, Fig. 1, is via the pinion-gear 50 meshing with the fly-wheel gear 51 of the clutch L, the gear 51 with the driving clutch-element 52, Fig. 16A, being loose on shaft 42 to which the driven clutch element 55 is fixed together with gear 46, Fig. 24 which intermittently rotates the shear. Thus fly-wheel 51 and clutch element 52 rotate continuously together, while clutch-element 55, shaft 42 and gear 46, Fig. 24, are stationary most of the time but intermittently are rotated by the fly-wheel to operate the rotary shear.

Hence motor P drives all the component mechanisms for operating on the roll of long stock Z to shear it into relatively short portions of uniform length.

The power drive from main-shaft T, Figs. 1, 10–14 to feed-rolls C, C1 is via the quadruple-lead worm 122 and the worm-gear 123, Figs. 1 and 6; worm-gear 123, Fig. 10, being mounted upon one of the two vertical drive-spindles 142, Figs. 10-11, driven by shaft T. Spindles 142, Fig. 10 are formed with a square hole at their top ends for receiving the corresponding squared ends of the sub-extending gear spindle 32, Fig. 11 for driving feed-rolls, C1L, Fig. 1 and spindle 167 for driving feed-rolls C, C1.

The power-drive from main-shaft T, Figs. 1, 10–12, to the feed-rolls C1L is via the double-lead worm 133, Fig. 10 and the worm-gear 134, Fig. 11; worm gear 134 being mounted on one of the two vertical worm-gear drive-spindles 142 driven by shaft T, Figs. 10, 11.

As to the speeds, motor P is preferably but not necessarily a constant speed A. C. motor of 1800 R. P. M. and, as the ratio between the sheave-pulleys 157 and 49 is as 1 is to 3, shaft T is theoretically rotated at 600 R. P. M.

The reduction ratio, Figs. 13 and 1, between the worm 122 and worm-gear 123 is as 1 to 3¾, and spindles 142, 167 for driving rolls C, C1 are rotated at 160 R. P. M.

As the speed of driving-gear-spindle 142, 167, Fig. 13 thus is only 160 R. P. M., the speed of feed-rolls C, C1 via spindles 168, 169, Fig. 14 and gears 16 is raised up to tune with the rate of rolls C1L and with the rate of reciprocation of shear-members F, 34. This is accomplished here by proportioning gear 16D, Fig. 13, to be large enough relative to gears 16, Fig. 14, as 4⅛″ diameter (gear 16D) is to 2¾″ (gears 16) pitch diameter. This arrangement of gear diameters increases the speed of spindles 169 and of rolls C, C1 to that of 240 R. P. M., which is the "tuned speed" for these members. Spindles 168 are dead and idler-gears 177 turn freely on them.

The reduction ratio, Fig. 11, between worm 133 and worm-gear 134 is as 1 to 7½. Hence the driving spindles 32 and 142 driven by shaft T are rotated at 80 R. P. M. which is the speed of rolls C1.

The stock-reel designated A, left Fig. 1, and Figs. 37–42, permits management of operation of the entire shearing machine by an operator not of unusual physical strength; the principal desirable characteristic of the operator being skill in properly setting the combination dies E, Fig. 30, and general intelligence in the operation of the machine. This reel relieves the operator from physical labor in the loading of a roll of long stock to be fabricated, or obviates the need of two or more men for reel loading. The past practice has been for the operator, generally aided by an assistant, to lift the rolls of stock from off the floor and to set them on the turntable or equivalent portion of the stock-reel. Here the turntable of the reel is raised and lowered by the operator's control of the reel-motor 201 thru the special switch-box 225, Figs. 1, 41 and 42. Transverse adjustment is provided for the entire reel A, including its motor 201, etc., whereby variations in the lengths of long stock of different rolls or coils, and different diameters of the rolls on reel A may be so compensated for as to allow the end of the long stock Z when loosened from its roll or coil on the turntable portion of the reel to pass to guide B, left, Fig. 1 along a line more or less straight from the perimeter of said complete or partial roll of stock Z, Fig. 5. Advantage is taken of the above transverse adjustment of reel A only between batches of long stock Z of substantially different roll-diameters and not between the relatively minor variations of stock-roll diameters of a given order of diameters.

The operator, preparatory to loading a roll of long stock Z on reel A, manually moves the switch-control handle 226 to left from its normal central position, Figs. 1, 41, thereby starting the small reel-motor 201, lower left, Fig. 1, which lowers the reel turntable in an anti-clockwise direction to dotted line position until one of the stops 227 contacts with and moves the switch handle 226 to normal central position to open-circuit motor 201. This stops the reel in position close to the floor where a roll of stock thereon easily can be rolled on its curved surface to a position in front of the reel-head or turntable and there looped over the projecting arms 216, by the operator's guiding of said roll of stock to tip it in the desired direction.

With the roll of stock once tipped or looped over the arms 216 of the reel-head, the operator then pushes the switch-handle 226 from central to right to start motor 201 in reverse rotation causing the now loaded reel-head to rise clockwise along its arc of motion until it approaches its desired twelve o'clock position when again one of the stops 227 contacts with and moves switch-handle 226 back to central position open-circuiting motor 201 and leaving the loaded reel-head in its operating or dispensing position. The operator then loosens the bindings of the stock-roll and manually feeds the van end of the coiled stock thru the stationary guide B, Fig. 1. Thence the van of the stock is engaged by the first pair of constantly power-rotated pinch-feed rolls C1 feeding Z forward to right to the several elements leading to shearing mechanism to be cut into sub-lengths of desired uniform length.

The reel A is built upon the reel-base 200 which in turn is mounted upon and attached to the machine pedestal Q via the support-casting 195, bottom left Fig. 1. Reel base 200 is transversely dove-tailed into the support-casting 195 for transverse adjustment of support-casting 200, effected by the adjustment-screw 196, Figs. 1, 7. Adjusting-screw 196 is journaled in the support-casting 195, Fig. 7, and held thereto by the collar-members 197, 197. Threaded unit-member 198 thru which screw 196 imparts transverse motion to support-casting 200, is a separate member and is fixed to the support-casting 200 from the bottom, Fig. 1, all of which allows easy assemblage of the several parts. The transverse reel-adjustment-screw 196 is milled with a squared end, lower right Fig. 7, to receive an operating wrench or handle not shown.

Support-casting 200 is formed with an upright portion 200U, Figs. 1 and 7, supporting switch-box 225 and pillow-blocks 206. Pillow-blocks 206 in turn support worm-shaft 205 and worm 207, Figs. 1 and 42. Worm-shaft 205 is driven by motor 201 via V-belt 203. Said belt operates from over small motor-sheave-pulley 202 to the larger receiving sheave-pulley 204 mounted on the overhanging-end of worm-shaft 205, Figs. 1, 42. There is a speed reduction under full-load conditions between said sheave-pulleys 202, 204, said speed-reduction being of the order of 770-192 R. P. M., the latter being the normal operating speed of worm-shaft 205. Sheave-pulley 202 is of the order of 3½ inch diameter and sheave 204 of 14 inch diameter, i. e. a 4 to 1 ratio.

The connection between worm 207 and the reel-head is worm-gear segment 208, Fig. 7. This is fixed to supporting-web 210W of the pivot-casting 210; the whole being pivoted on the dead-pivot shaft 209, Figs. 1, 42.

Pivot-casting 210, Fig. 7, extends upwardly, ending in the portion 210B which supports the reel-head and its retarding brake mechanism.

The reel-head, including parts 211—219, 232 and 233, is attached to the vertical center spindle 211. This spindle in turn is journaled in pivot-casting 210 at 210B, Fig. 7A, and is retained in proper vertical relation to 210B by ball thrust-bearing 233. Bearing 233 is interposed between the brake-drum portion 213 of reel table 212 and the upper surface of 210B. At the lower surface of 210B a collar 232 is fixed to shaft 211, Fig. 7A.

As shown in Figs. 7, 7A, 39 there is provided a brake mechanism including parts 213, 220, 221, 222, 223 and 224 and 234. The drag or tension of the brake is regulated at the will of the operator to prevent the coil-loaded reel-head from over-running and thereby snarling the coiled stock to such an extent that feed-rolls C—C1 may be prevented from feeding it causing spoiled material and decreased production.

Drum 213 of the brake is formed as an enlarged integral part of turn-table 212, Fig. 7A. Around drum 213 lies the encircling band 220 anchored to 210B by stud 221, the band being lined with suitable braking material 224. To provide resilience to band 220 it is formed with slot 223, Fig. 39. In addition, adjusting screw 222 threaded into one of the bifurcated ends of 220, acts to regulate the tension of band 220 thru the heavy coil spring 234, Fig. 39. This spring exerts a certain expansive pressure compressing bifurcated band 220 at all times; and it acts further as a lock for screw 222 to prevent the latter from moving from its adjusted position.

The turn-table shown as casting 212, Figs. 37–38, may be made from other materials or combinations of materials, such as part castings and part sheet metal, riveted, bolted, welded or otherwise fabricated together to perform the equivalent operation of supporting a coil of unprocessed material to be fed into the machine. As shown, turn-table casting 212 is formed with a round table-top having four, more or less, radially-positioned cored openings 215. Thru said openings extend the coil guide-fingers 216 which are radially adjusted into contact with the inside diameter of a roll of stock Z. The round table-top of 212 is supported from below by the integrally-cast supporting-arms 214. Said arms 214 converge into a hub formed on the brake-drum 213, Figs. 1, 6–7, 37. The lower side of said table-top portion of 212 is counter-bored at desired points to form bearing seats 212A for each of the adjusting-screw-bearings 219, Figs. 37, 40. By this method, the bearings 219 when once set to their seats 212A need only to be tightened down by cap screws 235, as the thrusts of adjusting-screws 217 and miter gears 218 are transmitted directly to the surrounding walls of said counter-boring 212A.

Adjusting-screws 217 and associated guide-fingers 216 alternately are formed or cut with right and left-hand threads, so that when a crank-wrench is applied to one of the worm-screws there will be transmission of the uniformity of motion to the stock-roll guide-fingers 216, in order to adjust guide-fingers 216 to the inside diameter of the stock-roll.

Reel-motor 201 is preferably of an alternating current constant-speed reversing squirrel-cage rotor type specially designed for similar classes of work such as for moving cross-rails, tailstocks and tool-traverse-equipment of machine tools. As diagrammatically shown, such motor is equipped, Fig. 41, with a three wire system, such as 236—239 so that the motor is not operating when the control-handle 226 is in the central position shown in Fig. 41. When control 226 is moved to left then the circuit thru the wires 238 and 239 is closed and the reel is lowered until the circuit is automatically broken by the contact of 227 with the extension of the switch-control 226. Springs 231, adjacent each side of the switch-control where 226 is pivoted on the stud 230, provide auxiliary energy to assist in the automatic breaking of the motor circuits by the trips 227—227, after the latter have forced 226 off from the terminal-clips 228 or 229, Figs. 41–42; and especially to keep 226 in a neutral position.

Superimposed over the speed-reduction unit 124 on pedestal Q is the roll-stand including C1, C, C1, Fig. 1.

Superimposed over speed reduction unit 135 are the pinch-feed rolls C1L.

In the feeding thru the machine of stock Z by the roll-stand rolls C1, C, C1, left Fig. 1, prior to operation by larger pinch-rolls, C1L, it is desirable to have the adjacent rolls C with a small horizontal spacing between them such as of 3½" more or less for rolls of the order of 3" diameter operating on stock ¼"–⅜" diameter. Such roll center distance necessitates a slightly smaller relative diameter of rolls C; this, so as better to deform and "break the back" of the stock coming from off the reel A so as to aid in insuring uniformity of length of sub-lengths Z1 produced by the rotary shearing mechanism, while feeding stock Z left to right, Fig. 1, to the flier D and beyond to auxiliary feed-rolls C1L. When the stock Z in its left-to-right travel, Fig. 1, comes under the feeding traction of pinch-rolls C1L then a considerable traction or feeding force must be exerted by said rolls C1L to prevent the van portion of the stock from rotating under the influence of flier D and to feed the stock to the shear 39, 114 and especially to pull the stock thru rotary flier D which cooperates with the turning of the rotary shear to be described and with feed-rolls C in producing uniformity of length of sheared sub-lengths Z1. One pair of large pinch-rolls C1L, as shown, to right of D, Fig. 1, such as three times the diameter of the small primary rolls C—C1 of the roll-stand rolls C, C1 will pull substantially equally with three pairs of smaller rolls C1L having the same diameters as roll-stand rolls C, C1.

Feed-rolls C, C1 rotating on spindles 169, Fig. 14, at 240 R. P. M. are operated by power three times as fast as larger pinch-rolls C1L, on spindles 131, Fig. 1, which turn at 80 R. P. M.; all these rolls feeding stock Z at the same rate.

In Figs. 10, 12, the worm-gear-unit housings 124 and 135 are supported on ledges 150 at the top of pedestal Q in a manner to sink 124, 135 substantially flush with the top of pedestal Z; 124, 135 being secured to Q by screws 151 and dowel-pins 152, Fig. 10, to prevent moving or misalinement.

The general design of the feed-roll stand is such that the rolls can be freed from pedestal Q, etc. as by removal of bolts, dowels, etc. and removed therefrom without other major dis-assemblage of the rest of the machine. This is made possible with the power-driven feed-roll units by the telescoping drive arrangement Figs. 10–13, between the vertical driving spindle 142 and the sub-projecting square ends of gear spindles 32 and 167. With the above "unit assembly" design, any one component roll-unit can be easily removed and transported for repairs to the machine shop which in a modern steel plant may be located a mile distant from the shearing machine hereof. Fig. 10, right shows a plan of the machine from which the roll-stand has been removed by lifting up and out, without disturbance of the assembly of hand-wheel 65.

In addition to the various transverse loads imposed upon shaft T at its medium high speed of 600 R. P. M., there are also present the longitudinal forces generated by worms 122 and 133 in their driving worm-gears 123 and 134. Said worm-generated axial thrusts and other existing loads are absorbed by anti-friction bearings, as follows. All thrusts in both axial directions are absorbed by bearings 137; all the radial thrusts are taken care of by the other bearings. To neutralize the worm-generated axial thrust loads, main shaft T, central left Fig. 10, is supported near its extreme left end by an adjacent pair of opposingly mounted "radiax" ball bearings 137. Each of these is a combination type of anti-friction bearing built for a combination load of both a radial thrust and a one-direction-axial thrust. The inner races of the adjacent combination bearings 137 are separated by a spacer 139 from worm 133 on shaft T. A second spacer 139 is interposed between the opposite end of worm 133 and the plain deep-grooved radial-thrust, anti-friction ball-bearing 138. Bearings 137—137 are mounted in housing 135 at top left, Fig. 10, with their outer races free longitudinally by a very short distance such as a total of from about five to ten mils. This minute endwise freedom of 137—137 is all the float allowed in supporting shaft T, endwise Figs. 10–11 said shaft otherwise being free of endwise support thereby allowing thermal expansion and physical thrusts which may be present or acting upon the shaft to be centered and absorbed on said bearings 137—137. The inner races of the "radiax" bearings 137, and the inner race of the plain bearing 138, are clamped longitudinally left to right against shoulder T1 of shaft T via worm 133 and spacers 139, by means of a threaded check-nut similar to part 132 upper right, Fig. 11, not clearly shown but located on the extreme left end of shaft T, upper left Fig. 10. The outer race of the deep-groove radial type bearing 138 and its lubrication are retained in proper mechanical relation to housing member 135, by means of retaining-plate 141. The outer races of the radiax bearings 137 are enclosed and retained in proper mechanical relation to housing member 135 by the end-cover and retaining-plate 136.

The right end of shaft T, Figs. 10-11, is transversely supported in housing 124 by two deep-groove radial-type anti-friction bearings 126—127; the inner races of 126—127 being clamped right to left, Figs. 10-11, against shoulder T2 of shaft T, by means of a threaded lock-nut 132 acting via worm 122 and spacers 129—129. The outer races of bearings 126—127 and their lubrication are retained in their proper mechanical relationship with housing 124 by end-cover 125 and retaining-plate 128 respectively, upper right, Fig. 11.

In the assembling of shaft T, worms 122 and 133, and worm-gears 123, 134 of different diameters and leads, Figs. 10, 11, within the housings 124 and 135 at the machine shop before the several units such as said housings 124 and 135 are fastened in place on the machine pedestal Q, the worm-gears 123 and 134 being of large diameters, are inserted in housings 124 and 135 thru side openings normally closed with covers 149 as shown from left in Fig. 12 and in plan in Fig. 10, and then assembled in place with interchangeable vertical shafts 142—142, when covers 149 are applied to retain the lubricant with which assembled housings 124 and 135 are more or less filled.

The ball-bearing mountings of shafts 142—142 within housings 124 and 135 are identical. Each shaft 142 is formed with a squared opening 166, Fig. 10, extending from its top end vertically downward sufficiently to receive drive-spindles 167, 32 of the power-driven feed-rolls.

Spindles 142—142, Figs. 11, 13, are supported at their top ends by the "radiax" anti-friction ball-bearings 143; and at their lower ends by radiax bearing 144S. Bearings 143—144 are opposingly mounted so as to absorb axial thrusts of spindle 142. The outer race of bearing 143 is retained in its position by retaining-plate 148, top left Fig. 11. The inner races of both bearings 143—144 are clamped upwards against the shoulder 142A via the spacers 145—145 thru the worm-gears 133 or 134 by the clamping action of the lock-nuts 146. The outer races of bearings 144 are retained in their proper positions by the retaining-plates 147.

The roll-stand located at upper central left, Fig. 1 top, is made up of the parts including rolls C and C1, Figs. 5, 13-14, their spindles 168, 169, and the intermeshing gears 16 and 177, all driven via gear shaft 167, Fig. 13, and by one of the vertical worm-gear shafts 142, etc. from main-shaft T, Fig. 10, all in turn being driven by motor P, Figs. 1 and 6. These several elements of the roll-stand are housed in supporting-casting 13, Figs. 1, 5-6, 13, 14, which casting in turn is rigidly secured to the top of the bed-casting or pedestal Q center left Fig. 1. Those of the pairs of feed-rolls C which are located on the front or operator's side of the path of stock feed, Fig. 1, are adjustable to and from the stock path. To permit such proper transverse relative adjustment of these rolls, they, with their spindles 169 are mounted in roll-boxes 15, 15 and 15A, 15A, Figs. 5, 13, 14. Similarly pinch-rolls C1, Fig. 1, with their spindles 169 are mounted in the roll-boxes 14—14, Fig. 13. The individual transverse adjustment of roll-boxes 15, 15A which support rolls C and their spindles 169, is accomplished by adjusting screws 17, Fig. 14, journaled in and secured to the group-adjustment plate 12 by collars 17C; the screws 17 having suitably squaremilled outer ends for an adjusting crank-wrench, not shown.

The two pairs of pinch-rolls C1, C1 are positioned permanently in close mechanical contact with long stock Z and do not require adjustment save for a tractive pinching relation with the stock; but rolls C are not only adjustable to desired spacing but are provided with means by which they may be removed quickly from their operating contact with the stock as at times when the machine has had a forced stop when it might be desirable to withdraw stock Z from between rolls C the latter being returned later to their exact normal operating positions. Such means provides for group-withdrawal and group-return of all the rolls C together with their spindle-boxes 15—15A as follows. The group-adjustment plate 12, Figs. 13-14, is transversely mounted and slidably supported or suspended by dovetailed ways 13W, Fig. 13, on the bottom of the roll-stand supporting-casting 13. The transverse movement of the group-adjustment plate 12, with the rolls C, and boxes 15, 15A, etc., is controlled for group-adjustment of all rolls C, by the adjusting-screw 10, Fig. 14, the nut 11, Figs. 14-15, and the handwheel 65. The special nut 11, Fig. 15, is the connection between adjusting-screw 10 and group-adjustment plate 12 via the open-ended slot 12S, Fig. 13 of plate 12. Slot 12S is provided so that the complete set of rolls C—C1 can be removed as a unit from its seat on pedestal Q of the entire machine, as shown in Fig. 10, without dis-assembling the adjusting-screw 10, Fig. 14, from its bearing support in bed-casting or pedestal Q. Thus all those rolls C on one side of the stock, Figs. 1, 5, 13, can be withdrawn as a group, to left, Fig. 14 and toward the operator Fig. 1, from their normal operating positions in feeding contact with the stock, by means of the operator's manipulation of front handwheel 65 in an anti-clockwise direction. Screw 10 and nut 11 are provided with left-hand threads. In the return of rolls C to their former operating positions, backwards, Fig. 1, the operator turns the handwheel 65 in a clockwise direction, causing group-adjustment plate 12, Fig. 14, to travel left to right until the forward end of the adjustable stop-screw 97 contacts with a portion of the supporting-casting 13. A lock-nut 98 is provided to lock the screw 97 in any position to which it may be adjusted. The small intermeshing idler gears 177 for driving the spindles 169 and rolls C—C1 are supported on short dead spindles 168, Fig. 14, and intermesh with gears 16—16D in the manner shown, Fig. 5, i. e., on the operator's side, not interfering with the transverse adjustments of rolls C—C1 and their spindles 167 and 169. Some of the dead spindles 168 are mounted in supporting casting 13, and others are mounted with the rolls C in roll-boxes 14, 15—15A; the latter mounting being such that the small intermeshing idler gears 177 are transversely adjusted with rolls C—C1 to and from the stock, Figs. 5, 13, 14.

The transverse stock-pinching adjustment of the pinch-feed rolls C1, C1 mounted in roll-boxes 14—14, Fig. 13, is via screws 17, Fig. 14, for adjusting said boxes. Screws 17, Fig. 1, for adjusting C1—C1 are journaled in and attached to each of the projecting cover-plates 18—18 the latter being fixed to supporting-casting 13, Figs. 1, 5 and 13. The same is the fact as to the transverse adjustment of the roll-boxes 15—15A, except that the screws 17 are journaled in and attached to the group adjustment plate 12, Fig. 14.

Long stock Z in its left-to-right passage, Fig. 1, thru the machine, and after emerging from feed-rolls C, C1, of the roll-stand at left, next enters rotary flier D, Figs. 1, 5—6, which further contributes to uniformity of length of sub-lengths Z1 sheared by the rotary shear 39, etc. Flier D is mounted in anti-friction bearings enclosed at 26—26, Figs. 1, 5 and 6, and is rotated, Fig. 1, by the multi-strand belt R, operating over small sheave-pulley 178, from the large sheave-pulley 156 mounted on motor-driven jack-shaft 153. The stock is pushed thru flier D by all the feed rolls C1, C2, of the roll-stand at left and is pulled then thru flier D by the larger pinch-rolls C1L at the right, Fig. 1, said final feeding by C1L being a pushing of the stock thru the shearing mechanism 39, 114 and beyond it to pass between the stock-guides I, J, K to the position of shearing and discharge of sub-lengths Z1. In Figs. 30—36, the assembled dies E are staggered or offset, Fig. 30, from left to right in the direction of stock feed to rolls C1L to aid in insuring that all sheared sub-length of stock Z1 shall be of the same length. Each assembled die E includes a steel holder 22, Fig. 31, containing a removable wearing-piece 21, Fig. 33, 34, 36, preferably of non-ferrous metal or brass which is grooved as shown to conform to the diameter and configuration of stock Z to be sheared. Clamping screws 23, Figs. 30, 31, are provided for adjustment of dies E to their staggered positions shown, Fig. 30, the last two dies to right nearest feed-rolls C1L being almost in alinement, and the rest being progressively staggered. The hexagonal cross-sectional shape of such wearing member 21 provides a substantially solid seat for engaging the dieholder 22 diametrically opposite each of the three grooves of 21; said construction of 21 also provides an advantageous means of locking 21 in holder 22, as shown, upon closing of the hinged portion of holder 22; and said construction of 21 also permits its low-cost manufacture from long brass stock of the same cross-sectional shape by merely sawing off a short length thereof for each piece 21 ready without further machining for use in holders 22. The three grooves in 21 may be used successively by removing each piece 21 from holder 22 and replacing it at a different angle so that another grove contacts with the stock moving longitudinally toward feed-rolls C1L and the shearing mechanism.

Long stock Z moving left to right, Fig. 1, from flier D, next enters between the large pinch-feed rolls C1L to be pulled and pushed further rightward to the rotating and reciprocating shearing mechanism 39, 114. When the rear (left) end of a very long length of stock previously coiled on reel A at left, has passed the second pair of pinchrolls, C1 at right of the roll-stand but as yet has not reached feed-rolls C1L, then the latter or larger rolls C1L further act to draw such left end of stock Z from left to right thru flier D and push it to and thru the rotary shear.

Pinch-roll unit C1L includes vertical spindles 131 and Fig. 5, the train of gears 27—29 and 130, all driven via spindle 32, Figs. 1, 11, connected to one of the vertical worm-gear shafts 142, etc. driven from the main shaft T, central left, Fig. 10, and the motor P. The large pinch-rolls C1L, like the small pinch-rolls C1 of the roll-stand to left, Fig. 1, have their adjustable spindles 131 mounted in a transversely adjustable roll-box 25, Fig. 5. This box is transversely adjusted by adjusting screw 19, Fig. 5, journaled in and supported by cover-plate 33 secured to housing 24, Figs. 5, 6, in turn rigidly secured to machine-pedestal Q, right central top, Fig. 1. Adjusting-screw 19, Fig. 5, is provided with operator's handle 20 at the machine-front, Fig. 1.

The passage of stock Z to and thru the final or large pinch-rolls C1L, feeds it further rightwards to the shearing mechanism 39, 114, Fig. 1, detailed in Figs. 23—28; the van of the stock passing thru the rotary shear and beyond to the right toward target trip X, Fig. 19, sectioned from 19—19, Fig. 2, the van of the stock then engaging the target and causing the two-station roll-locking clutch L, Figs. 1, 5—6, detailed in Fig. 16A, to function thru a half-revolution cycle to rotate the shear and shear a sub-length of stock Z1 of desired length from the van of the long stock Z being processed thru the machine as a whole.

The shearing mechanism of which the general location is indicated at 39, 114, Fig. 1, upper right, and Fig. 23, to right of pinch-feed rolls C1L, includes in its simplest form shown, five principal elements, as follows, Figs. 26, 27, 28.

*First.*—Shear-shaft 40, Figs. 28, 23—26, which is mounted in stationary supports and itself supports all the movable parts of the shearing mechanism but preferably not the driving mechanism.

*Second.*—The rotary tool-carrier 34 carrying and intermittently revolving the plurality of tools or tubular dies H, Figs. 24, 25, and itself axially supported on shaft 40.

*Third.*—The non-rotatable tool-carrier F, Fig. 28, alongside rotary carrier 34 and carrying tubular die G for shearing cooperation successively with dies H of carrier 34. This carrier F, like carrier 34, is supported on shaft 40. Shearing of the stock is effected, Figs. 26A, 26, by rotation of carrier 34 which revolves one of its dies H down alongside die G on the stock passing thru and emerging from die G.

*Fourth.*—The stationary control-member 39, Fig. 27, which holds carrier F from being rotated by rotary carrier 34 notwithstanding the adjacent location of these two carriers 34, F.

*Fifth.*—The helical spring S on shaft 40, Figs. 25, 23, which is employed when, as preferred and shown, for continuous stock-feed, the two tool carriers are reciprocable parallel with the stock, i. e., longitudinally.

This preferred combination involving the feed of the stock at a uniform rate is both the most rapidly productive method and the simplest mechanical arrangement as distinguished from permissible mechanism for intermittently discontinuing the stock-feed while shearing by rotatable carrier 34 in a condition where both carriers 34 and F are fixed from movement parallel with the stock. In the preferred disclosure the function of spring S as an energy-storing device alternative with a weight, is to force carriers 34, F to return leftward opposite to the rightward stock-feed, i.e., back to their normal position of rest during the interval when most of the stock for a sub-length to be sheared is being fed rightwardly beyond the shearing mechanism into position for shearing. In such case spring S is compressed by the forward rightward movement of carriers 34, F in the direction of stock-feed, such forward movement being caused by the rotation of carrier 34 and the action on its cams 38 by cams 39C of control-member 39. Shearing is effected during such forward movement, Figs. 25, 26A, when the shear and the stock all are moving in the same direction and at substantially the same rate. After the shearing, and when the shears are in their extreme forward position at right, then compressed spring S in due season forces the carrier backward which is at a time just before rotary carrier 34 has been braked to its normal circumferential position of rest, to be described.

Thus, the entire shearing mechanism is located within housing 114, Figs. 1, 23, 26, and comprises only members 39, 40, 34, F, and S. Housing 114 and control-member 39 are stationary and secured to machine frame Q. Short shaft 40 within housing 114 also is mounted on stationary supports, i. e. 113, 114 and 39; its right end, Figs. 26, 23, being mounted in the out-board bearing casting 113 of the housing 114, and its left end, Figs. 28, 27, in control-member 39. Shaft 40 would be the only carriage for tool-carrier or supports 34, F, and a single or central axial carriage therefor, even if it were reciprocable as is not preferred. But in the preferred permanent stationary condition of shaft 40 there is no carriage for tool-carriers 34 and F as if they were supported in side a tube; and they are both supported by shaft 40 and reciprocable thereon as a unit, (altho only one is rotatable) when, as preferred and shown, the stock is not stopped intermittently but is fed continuously at a uniform rate, and shearing is effected while the two tool-carriers are moving forward with the stock during the latter part of the rotary movement of carrier 34. If the stock-feed be stopped intermittently then rotary tool-carrier 34 mounted directly on shaft 40 is the only movable shear-element; but in the preferred arrangement shown there are two movable shear-elements, i. e., the carriers 34 and F, aside from spring S which is compressed and alternately allowed to expand; this movable condition of 34 and F exclusively existing when shaft 40 neither reciprocates to move the two tool-carriers with the stock or rotates to operate carrier 34, i. e., when carrier 34 as shown is not keyed to shaft 40 but is rotated independently thereof, as preferred and shown, by its peripheral gear-teeth 44, Figs. 28, 26, 24–25, some such peripheral drive being preferable to an axial drive as by shaft 40 for shearing very long steel stock of the larger diameters (rods) or narrower widths (narrow strips) passing through tubular, i. e. hollow dies G, H. Thus carrier 34 serves as a means which connects any suitable arrangement of gear-teeth 44 with tools H thereby revolving the latter. The teeth 44, even if spiral, extend generally parallel with the moving stock and are arranged annularly in a plane at right angles to the line of stock-feed. And thus shaft 40 preferably is stationary and as such supports both movable carriers 34 and F, carrier 34 being freely rotatable about shaft 40 as a stationary axis, and both 34 and F being freely slidable along shaft 40 in their cooperating adjacent positions.

The peripheral drive of the shearing mechanism via gear-teeth 44 disposed on carrier 34 in some suitable manner as shown, as distinguished from a drive by shaft 40, is effected intermittently by gearing meshing with such teeth, Figs. 24, 25, and driven from clutch-shaft 42 on which latter is mounted clutch L, Fig. 16, intermittently driven by heavy continuously-rotated element or fly-wheel gear 51. Shafts 47, 42 of this transmission are mounted on stationary supports rigid with frame Q of the machine, Fig. 8; i. e. these shafts are not carried by any of the movable parts of the shearing mechanism, and the movable shearing mechanism including driven teeth 44 is entirely free of all driving parts which otherwise would add to its mass and momentum. This arrangement provides for short and rapid movements of the shears causing accurate intermittent operation and quick braking to desired position of rest relative to the moving stock, particularly as to the circumferential normally stationary positions of rotary carrier F. Gear 45 on idler-shaft 47 and meshing with gear-teeth 44, also meshes with driving gear 46 keyed at 43 to intermittently rotated clutch shaft 42. The face of longitudinally fixed intermediate gear 45 is wide enough, Fig. 23, to keep it in mesh with gear-teeth 44 during the very short longitudinal excursions of carrier 34; the teeth 44 sliding left and right with tool-carrier 34 along the teeth of gear 46. Clutch L, Fig. 16, is given one-half a rotation upon each of its succeeding operations, and for each half rotation it imparts a one-third rotation to carrier 34 when as shown the latter carries three tubular dies H. When clutch L is stopped and its shaft 42 with gear 46 is braked, then carrier 34 stops rotating and resumes its normal angular position with its cams 38, Figs. 27, 28, just rightward clockwise of cams 39C on control member 39; but just before carrier 34 has completed fully its said rotation it is held instantaneously at its extreme rightward position by the engagement of the plateaus of the two sets of hill-cams 38, 39C; and as soon as the rotation of carrier 34 has moved said cam-plateaus out of engagement, the spring S expands to move leftward both carriers 34, F while 34 is at or nearing the end of the rotation and moving leftwardly down hill relative to cams 39C.

The construction and arrangement of the shear-mechanism hereof is compact and powerful in respect both of its longitudinal and radial extent relative to its central supporting shaft 40. When, as shown and preferred, the gear-teeth 44 are located radially outward beyond dies H on carrier 34, then the heavy shearing duty is executed at a point intermediate the pivot of the lever-arm, i. e., shaft 40, on the one hand, and on the other the point of application of the power, i. e., the gear-teeth 44, this constituting a very powerful shear which in the present invention is combined advantageously with the accuracy of timing by virtue of the limited mass and moment of the tool-carriers 34 and F as preferably substantially the only movable parts of the shear-mechanism aside from the power-drive for gear-teeth 44 which is mounted on stationary supports quite independently of the tool-carriers. Such preferred location of gear-teeth 44 radially outward from dies H on carrier 34 also permits the location of said dies in positions close to the pivot 40 for ample power; and in this location the means which carry said teeth, such as the carrier 34 itself, is formed with the longitudinal stock-passages O which permit stock Z to pass thru both while the shearing mechanism is stationary and while carrier 34 is in rotation, for this purpose the openings O being circumferentially oblong as shown, Figs. 25–26. When, as shown, the revolving shearing tools H are in the form of hollow dies inside which the stock fits and passes, Fig. 26A, and such dies are mounted in carrier 34 to extend longitudinally entirely thru it, each of them is formed with a lateral opening, Fig. 26A, in its advancing side, said opening communicating with its hollow interior; and such dies are mounted in carrier 34 in positions at the rear of oblong carrier-openings O so that the latter are in communication with said lateral openings in dies H. Fig. 24 shows normal stationary conditions, when stock Z passes continuously thru the forward ends of longitudinal carrier-openings or slots O. When the roll-locking clutch L of Figs. 16, 16A, is started intermittently to revolve gear-teeth 44, then carrier 34 advances, revolving a die H toward stock Z, without disturbing the latter, owing to slots O, until the walls of the lateral forward opening in the die, Fig. 26A, embrace the stock, immediately followed by the shearing impact of the upper or rear portion of the die backed by the mass of die-carrier 34. The moment for this blow comes from continuously rotating heavy fly-wheel gear 51, Figs. 1, 5, 6, 7A which intermittently drives clutch L, Fig. 16, both said fly-wheel and clutch being mounted on a stationary support or supports as shown independent of tool-carriers 34 and F so that neither heavy fly-wheel 51 nor clutch L participates in the longitudinal movements of the tool-carriers which therefore can be braked readily and with great accuracy independently of the fly-wheel and driving clutch-member notwithstanding the great shearing power of this mechanism. Upon the disconnection of fly-wheel 51 by means of the clutch L from gears 46, 45, 44, Fig. 24, the only intermittent parts left in motion are said rotating disconnected parts including the body of the clutch and the carrier 34 with its three revolving tools H; because the forward longitudinal motion of the two die-carriers has ceased owing to the dwelling action of cams 38, 39C, Figs. 27, 28 to be described. This system of clutch and gears, now stationary upon completion of shearing stock Z, is readily braked by mechanism to be described, to bring the next carrier-opening O, Fig. 24, in line with the continuously feeding stock Z; the action being effected with great accuracy to bring the forward clockwise end of this next opening O in line with the stock, Fig. 24. While the momentum of the driven member of the clutch to be braked is considerable yet as a whole this normally stationary system has minimum inertia on account of the minimum mass of carrier 34 and driven gear-teeth 44 which with dies H now during braking are the only moving elements of the shear-mechanism proper as distinguished from its drive.

During the interval while carrier 34 is rotating to revolve its next slotted portion O in front of the new van of moving stock Z from which a sub-length Z1, Fig. 26A, has been sheared, said carrier continues its forward longitudinal movement with the stock. As will be described the brake is applied before the end of such longitudinal carrier movement. But at this stage which is critical for the high rate of continuous stock-feed permitted by this invention, provision is made to discount the desirable and illustrated short longitudinal travel of the two tool-carriers 34 and F, and to permit continuous stock-feed notwithstanding the stoppage of such longitudinal carrier movement, so that there will be no interference with the advancing stock by carrier 34 while the latter yet is rotating but before it has rotated far enough to carry its next opening O in front of the stock. This provision, Fig. 26A, includes the formation of a stock-clearance space 34A in carrier 34, with an incline leading from the left face of the carrier toward the right and communicating with the next carrier-opening O. At this time, Fig. 26A, the sub-length Z1 has been transversely forced off by true shearing from the main line of stock Z, the longitudinal forward movement of both tool-carriers has ceased, the new van of stock Z is continuing to advance, and carrier 34 is about to complete its one-third rotation to bring the next carrier-opening O in front of the stock, that is, the forward clockwise end of slot O. At this point and before O comes in line with stock Z, the latter is free to advance into clearance space 34A but as it does so the carrier 34 continues to the completion of its rotary movement, and the inclined wall of clearance space 34A moves clockwise out of the stock-path so that there is no interference between the longitudinally stationary carrier 34 and the advancing stock van and finally the next opening O comes in front of Z for the stoppage of rotation of 34 in its normal position of rest.

The above arrangement, where the fly-wheel 51 is cut off instantly upon completion of the heavy-duty shearing and where there is minimum momentum of the shear mechanism and great accuracy in control of intermittent shear-stoppage, is advantageous in combination with the plurality of revolving tools on rotary carrier 34, involving a minimum of rotary movement of said carrier for each shearing operation.

The duty on the intermittently acting clutch L is severe but that is reduced greatly by the above arrangement in that the heaviest load on the clutch, i. e., that which occurs when one of the revolving tools strikes the stock, is not applied until after the application of the starting load, i. e., the load on the clutch when the gears to shear-teeth 44 start to rotate carrier 34. This separation of these two clutch-loads is permitted by the oblong carrier slots O; the rotation-starting load being applied to the clutch while, Fig. 24, the tool H is remote from stock Z, and the active shearing load not going on, Fig. 25, until thereafter the walls of slot O advance clockwise on opposite sides of stock Z and then clockwise advancing tool H thereupon strikes the stock.

The severity of action on the intermittently operating clutch is relieved further by the even later application of the load on the clutch which involves starting the two tool carriers 34 and F from their normal positions of rest in their longitudinal travel forwardly with the stock. This travel is very short and commences instantly at the full rate of stock feed so that it is useful to have its starting load go on the clutch at a time a little after the clutch-load for commencing rotation of carrier 34. This positive longitudinal forward movement to the right, Fig. 26, caused indirectly by power from the clutch L, Fig. 16, is caused directly by the rotary movement of carrier 34 by way of its cams 38 revolved over stationary cams 39C on stationary control member 39 (or over a single roller carried by a stationary stud). Normally in the stationary condition of carrier 34 its cams 38 lie clockwise adjacent cams 39C on 39, all of the cams 38, 39C being spaced apart circumferentially widely enough so that cams 38 normally are widely spaced from those cams 39C which are ahead of them clockwise. Thus carrier 34 can rotate freely at first before it is pushed forward in the direction of stock-feed by the clockwise movement of cams 38 up the slope of hill-cams 39C. Thus, owing to the wide spacing of these cams the load of starting the longitudinal forward movement of carriers 34 and F is not put on the clutch until after the initial clutch-load of starting rotation of carrier 34 has been applied to the clutch. But this second clutch-load is applied just prior to the final main load of active shearing at the instant shown in Fig. 25. That is, the short longitudinal linear movement of carriers 34 and F is applied during that portion of the one-third rotation of carrier 34 when it is moving from its position of Fig. 25 to its position of Fig. 26A. The three cams in each of the two above sets correspond in number with the number of tools H on carrier 34.

The slopes of these hill-cams (especially 38) are coordinated with the rate of stock-feed which may be preferably high in this machine, especially when continuous and uniform as preferred and shown. These slopes are designed to cause the entire longitudinal forward movement of the carriers, from start to finish, to be at the same rate as the stock-feed, caused by large pinch-rolls C1L, Fig. 23. The longitudinal movement however is very short owing to the quickness of the one-third rotation of carrier 34; and the latter quickness without waiting for a complete rotation of carrier 34 permits the desired high rate of stock-feed which in turn requires the rapid longitudinal forward movement of carriers 34 and F. The above delayed starting of the longitudinal carrier-travel results in so short a travel that there is no time for gradual acceleration up to the rate of stock-feed.

Figs. 27, 28 illustrate the compactness and lightness of the shear mechanism in general and particularly in the preferred simple form disclosed, wherein carriers F and 34 lie closely adjacent altho only one (34) rotates while both reciprocate as a unit; the adjacency of these carriers being desirable because the tools G, H respectively, Fig. 26, operate adjacent one another in the act of shearing. One desirable way of combining carriers 34 and F is shown in Fig. 26 where carrier F is formed with a quill-hub FQ embracing shaft 40 and extending thru carrier 34 on the axis of the latter on which 34 rotates; carrier 34 being held between the left or main radial position of F and collar 117 screwed on the right end of quill FQ so that both carriers are movable longitudinally of shaft 40 while carrier 34 is rotatable on quill FQ. In the preferred example shown the quill FQ slides along shaft 40 carrying tool-carrier 34 with it while carrier 34 rotates on FQ; and gear-teeth 34 are formed on the periphery of carrier 34, and no separate gear is mounted on shaft 40 and said shaft is fixed both against rotation and reciprocation. But the constructor is informed that various equivalent arrangements of this machine can be made with or without the preferred feature of the location of gear-teeth 44 as shown a greater distance radially from the center of rotation than the revolving tools H, or on carrier 34.

The forward longitudinal movement of carriers 34 and F stores energy in spring S, Fig. 26, by compressing it, collar 116 slidingly embracing shaft 40 and serving as abutment for the left end of the spring, the other end of the spring being supported as shown. This energy-storing device for returning gear-teeth 44 and tools H longitudinally to normal position of rest, may be embodied in various ways in the various possible equivalent arrangements of the remaining mechanism.

In operation, after clutch L has been connected to fly-wheel 51 to start turning gear 44 which preferably is the only gearing bodily movable with the shearing tools, and after that tool H which lies nearest to stock Z in an anti-clockwise direction has started toward the latter, then just before H strikes Z, an inclined cam 38 is revolved against an axially stationary device such as a cam 39C which instantly owing to the incline on cam 38 moves the two tool-carriers 34 and F longitudinally forward as a unit in the direction of stock-feed and at substantially the same rate or only very slightly faster; and during that short, quick forward movement of cooperating shearing tools G and H, the latter, passing down alongside the former, strikes stock Z and effects the true shearing action.

The hollow dies G and H extending thru their carriers F, 34 are secured therein by binding collar-head-screws 35, Figs. 26, 28, and Figs. 23-25.

That one of the tools H which is next to act in stock Z lies normally in a position a little before twelve o'clock, Fig. 24, so that its shearing action, when three tools H are employed, will occur around three o'clock, Fig. 25, or below, while the tool is moving down; that is, the line of feed for stock Z is more or less in the same horizontal plane with shaft 40.

Carrier F, even when laterally contacting with carrier 34 as shown, is prevented from participating in the rotation of 34 by suitable means such as stationary pin or pins 37 on control-member 39, Fig. 27, such pin or lug engaging in a recess 36 in F.

When control-member 39 is provided for the purpose as shown for carrying cams 39C as distinguished from a single fixed-pivot roller for cooperation with successive revolving cams 38, then member 39 is formed with opening Y, Fig. 27, for passage of stock Z in line with dies G and H; and for compact association of 39, F and 34, said hole Y is shown laterally large enough to receive die G and its securing screw 35, Figs. 27, 28.

In the particularly compact arrangement shown, carrier F lies radially inside of inclined cams 38. Also pins 37 lie radially inside of cams 39C, both 37 and 39C being combined here in the single stationary control member 39 serving also as end-support for shaft 40. And here the cams 38 normally lie snugly between successive cams 39C; and F and 34 never move further from cams 39C than the length of pins 37. But cams 38, which are pluralized when tools H are pluralized as preferred, need not be carried directly by carrier 34 provided that they are arranged to be revolved with tools H so that upon the tool-revoluton the cams cause the longitudinal movement of both tool-carriers. And the entire control-member 39 may be dispensed with for cooperation with carriers F and 34 provided that equivalent devices are furnished to hold F from rotation, to cooperate with cams 38 to translate the rotary motion of gear 44 into longitudinal motion of 44, 34 and F, and to support the end of shaft 40. When gear-teeth 44 lie radially outward beyond tools H as preferred they cannot be mounted between carriers 34 and F; and in general the quill FQ, Fig. 26 is an important feature when shaft 40 is stationary, whether or not the quill be a hub of carrier F; for this quill slides on shaft 40 when the latter is stationary, and the quill carries in longitudinal reciprocation all the parts which include carrier F and its tool G, carrier 34 and its tool or tools H, cam or cams 38, and gear-teeth 44, (and three more cams V to be described), all in any desired or convenient arrangement of said parts; the only important parts of this combination which do not participate in the longitudinal shear-reciprocation being the device such as cam 39C which translates the rotary motion of cams 38 into the longitudinal forward motion of the parts, and the device such as pin 37 which prevents carrier F from rotating with carrier 34, and shaft 40; and these devices are mounted on stationary supports as shown. The quill FQ is of importance in cases such as shown above where 40 is not rotated. In cases where gear-teeth 44 are mounted or formed in tool-carrier 34, the latter is not keyed to its non-rotating axial support such as quill FQ; and carrier F which is movable only longitudinally is not keyed to any support on which it may be mounted, notwithstanding that as shown it is supported, as is carrier 34, on shaft 40 which as a shaft is a rotatable element and may be rotated if not threaded as shown. Shaft 40, with its left end screwed at 41, Fig. 27, in stationary control-member 39, and its right end supported in stationary housing 114, Fig. 23, is the sole support of all the movable shearing mechanism proper, save for single gear 45, Fig. 24, engaging gear-teeth 44, and lying more or less below them; and hence the two-tool-carriers F, 34 are practically isolated save for their said simple supporting and operating means.

The return action of spring S starts instantly when a plateau of one of the cams 38, Fig. 28, leaves the cam 39C, Fig. 27. Before that plateau leaves cam 39C and while it engages 39C, the tool-carriers are held instantaneously at the extreme end of their short forward longitudinal motion. This is the instant just after shearing has been completed, Figs. 25, 26A and while the tool H which has just acted to shear, is approaching the end of its partial revolution. Stock Z passes beyond the right end of tool G almost instantly after the termination of the action of a cam 38 in pushing itself forward causing like movements of the shearing tools. It is at this point that clearance space 34A permits the continuing advance of stock Z, Fig. 26A. The inclined wall 34A is designed to bring the extension clearance space of O as far downwardly forward as is practicable without weakening the carrier-support for tools H. In Fig. 26A the position of the van of stock Z just to left of the right end of die G just after shearing indicates the fact that the tool-carriers momentarily have been moved longitudinally at a very slightly faster rate than the stock; the slopes of cams 38 having been designed with that object relative to the rate of large pinch-feed rolls C1L, Fig. 23; so that by the time stock Z begins to move beyond tool G there will be time for carrier 34 to rotate far enough to bring clearance 34A in front of the van of stock Z. Spring S is not freed for its abrupt tool-return action, however, until carrier 34 has rotated far enough to bring its opening O in front of stock Z or substantially so; that is, the plateau of revolving hill-cam 38 does not let go of cam 39C until about that instant; its plateau serving to prevent premature action of spring S before O comes in front of Z and to give enough time for carrier 34 to move far enough beyond shearing position to prevent blocking the advancing stock. Thus Fig. 26A illustrates the instant when the tool-carriers are about to reach the end of their extreme forward rightward movement. That end will be reached when 34 has moved far enough down to permit stock Z to feed into clearance 34A. The two carriers are held instantaneously at the end of their rightward movement by means of the plateau of cam 38; and during that time, and while the stock is feeding into the clearance 34A, carrier 34 moves farther downward, thereby increasing the clearance length in front of stock Z and finally carrying perforation O in front of the stock. As soon as the stock is free to pass thru carrier-opening O, and therefore carrier 34 is free to move opposite to the feeding stock, the cam plateau of 38 lets go of cam 39C, and spring S abruptly moves the two carriers leftward back to their normal stationary positions; cam 38 going with them and the rotary system being braked as 38 slides back on the slope of 39C, and coming to rest with cam 38 in position just clockwise beyond cam 39C in readiness for the next shearing cycle or one-third rotation of carrier 34.

As will be described, the advancing stock itself controls the clutch L which intermittently furnishes the power for the above operations.

The further construction of the shear-mechanism shown is as follows.

The stationary shear-housing or cowl-casting 114 Figs. 1, 23, 26 constitutes a cover or guard over the entire shear-mechanism. This casting 114 is seated on and secured to the machine-frame or pedestal Q, Figs. 1, 6, 8 on horizontal ledge Q3 of Q.

Shaft 42 of gear 46, Figs. 24, 5, 6, supported in bearings 48—48, extends from clutch L into line with housing 114 wherein its left end is mounted, Fig. 6, the brake mechanism 61—64 being secured to ledge Q3 of machine-frame Q by the anchor bolts 63.

Among the various advantages of the illustrated shearing tools G and H, H, H, shown as is that there is economy in respect of their shearing corners and the grinding thereof, i. e. the corners at the bottom of die G, and at the parts of dies H which lag in the direction of their revolution by their rotary carrier 34. That is, between grindings of die G, it may be turned in its seat in carrier F, say a one-third turn, to present a fresh shearing corner to stock Z; and while dies H having lateral stock-passages cannot be so turned, yet as they exist in multiple and act in succession their prime shearing condition will endure as long as die G if turned as above. Thus in this arrangement the useful condition of all four dies will continue three times as long without removal and grinding.

Dead stud-shaft 47, Fig. 23, for wide-faced intermediate gear 45, is supported between the two walls of housing 114, Fig. 23A. Stud 47 is clamped to housing 114 by nut 179 outside the housing, Fig. 6. On stud 47 its gear 45 is mounted via ball-bearings 180, Fig. 23A. Stud 47 is formed with a shoulder 47A retaining the intermediate bearing-structure between 47A and the opposite wall of housing 114, so that when nut 179 is screwed up then the stud 47 and the intermediate bearing structure are drawn to the right-hand wall of housing 114 and clamped thereto. The ball-bearing structure includes the three horizontal spacers 181—2—3 and two vertical retaining plates 184.

Stud 40, Figs. 26, 23, 28, which supports the two die-carriers F and 34, also is supported rigidly by housing 114; its left end, Figs. 28, 26 being screwed into stationary cam-control member 39 which in turn is secured to machine-frame Q; and the right end of stud 40 being mounted, Figs. 26, 23, in out-board bearing-casting 113 secured to the outside of housing 114. Guide-bushing 111, mounted in bearing 113 and stud 40, forms a guiding-chamber for the compression of shear-return spring S and constitutes a buffer between the spring and adjusting nut 112.

Tool-carrier 34 itself, Fig. 26, rotating on tool-carrier F and reciprocating linearly therewith, is mounted on the ball-bearings 118 on the rightwardly extending quill FQ of carrier F, between collar 117 on said quill and the main portion of F at right, so that both carriers as a unit can reciprocate right and left, but carrier F can be held from rotation in the direction of carrier 34. Said ball-bearings 118 have their inner races spaced by spacer collar 119. Collar-nut 117 screwed on quill FQ holds the bearing-assembly of carrier 34 in proper relation to carrier F. Bearings 118 are enclosed to retain their lubricant by means of cover-plate 120 secured to the side of carrier 34 by cap-screws 121. Collar 116 is floatingly secured directly to stud 40 and acts as left-hand abutment for spring S of which the right end abuts against bushing 111.

Die-carrier 34, in addition to effecting stock-shearing by its rotation, also acts, toward the end of each of its partial rotations to operate mechanism causing discharge of the sheared sub-length of stock from the position in which it was supported prior to and during shearing. For this purpose, rotary carrier 34, Fig. 26, top, is formed with an annular groove U in its right side or face. In grooves U are secured three cams V, Figs. 23, 25, 26, 28, disposed circumferentially around the side of 34, by one of which cams the rotation of 34 upon shearing the stock, causes the downward movement of bottom stock-guide K, Fig. 3, and with it a positive pulling down of a sheared sub-length Z1 of stock so as to prevent jamming of the sub-length inside the stock-guides of a more or less crooked sheared sub-length. This insures free space for continued feeding advance of unsheared stock Z forwardly to and thru the stock-guides beyond the shear-mechanism. In Figs. 25, 26 the cams V successively effect said positive pull-down of successively sheared sub-lengths Z1 by their action on roll 90 on pin 90A which operates lever 89. Lever 89, Figs. 26, 8, operates the rock-shaft 108, Figs. 3, 8, 4, and 6, which oscillates the several levers 109 thereon, Fig. 3. The left ends of levers 109 support bottom stock-guide K.

Three stock-guides I, J, K, Figs. 1–4, extend rightward from the shear mechanism, Fig. 1, sufficiently far to provide a normally enclosed longitudinal stock-feeding chamber to receive, prior to shearing, the longest sheared length of stock Z to be sheared and extending rightwardly forward of the shear-mechanism. Top guide I is fixedly secured, Figs. 3, 21, to the lower end of the over-hanging goose-necks at the tops of vertical machine-supports N. To the ends of guide I is secured, Fig. 20, the laterally moving guide J, by means of parallel links 99, 100 pivoted at 186, 187 to guides I, and J, so that the latter can be swung outwardly from guides I and K by advancing stock Z to trip clutch L; said lateral guide J being moved by mechanism to be described later, including a tripping target X successively operated by the vans of successive portions of the long stock Z to be sheared.

As to downwardly moving bottom-guide K, that is supported, Figs. 3–4, by the left ends, Fig. 3, of a pair of levers 109 secured to the ends of guide K and oscillated by rock-shaft 108 extending horizontally, Figs. 4, 6, away from the shear mechanism.

When a cam V, Fig. 25, is revolved by carrier 34 into contact with roll 90, the shaft 108 is rocked and the left ends of levers 109 go down, and they move guide K down with them, and the sheared stock Z1 also, as follows. In Fig. 19 is shown one of several pull-down devices 140 embracing guide K at various portions of its length and attached to K by wing-screws 175 in adjustable positions. Each device 140 is formed with a hooked end 176 beneath which stock Z is fed freely; but when guide K is forced down via rotary carrier 34, one of its cams V, the shaft 108 and levers 109, Fig. 3, then all the pull-down devices 140 go down also the sheared sub-length Z1 176 force down which has just been sheared off by the same partial rotation of carrier 34 which moves one of its cams V against roll 90 to pull down the devices 140. Thus the sheared sub-length Z1 is forcibly removed from a position of possible jamming inside guides I, J, K, particularly if it is a little bowed and therefore actually has become jammed, Fig. 18, between top-guide I and stock-holding devices 172, Fig. 22, which act to insure uniform sheared lengths of stock which may be more or less bowed as will be described.

The above downward movement of stock-guide K to insure by the action of rotary shear 34, the moving of K down, and the discharge of a sheared sub-length, is a different feature from the mechanism which moves lateral stock-guide J leftwardly; for such lateral bodily swinging movement of guide J is caused by the forward feeding of the stock itself and is involved with movement of the stock itself and is involved with the target trip X for shear-clutch L which is controlled by the forward feeding motion of stock Z. However, in any case, Figs. 3, 21, there is co-operation between the lateral motion of guide J caused by forward feed of stock, and occurring just before initiation of a cycle of the shear-mechanism, on the one hand, and on the other, the downward movement of bottom-guide K caused by the latter part of the partial rotation of shear 34 upon completion of its action in shearing the stock; because said successive movements of the two guides J and K, Fig. 21, K immediately after J, open up the normal longitudinal chamber between the guides for stock-feeding so that when that opening just afterwards is established fully instantly upon shearing by the downward movement of bottom-guide K, the relatively short sheared sub-length Z1 is compelled by gravity to fall away from the bottom of stationary stock-guide I and drop into discharge-receptacle M, Fig. 3.

Cams V, with rotary shear 34 on which they are mounted, Fig. 25, are at about the ends of their movements when one of them acts on roll 90, Figs. 25 and 8, to swing lever 89 and rock the shaft 108, Figs. 8, 3, 4, 5 and 6, and swing bottom-guide K downwardly, Fig. 3, by the oscillation of levers 109 about shaft 108 as a center. In order to return bottom-guide K promptly after a given sheared sub-length Z1 has been discharged by gravity, to the normal position of K up against most of the lower surface of stationary top-guide I, in position, Figs. 3, 18–20, to support the new stock-van now passing thru the shearing-mechanism in its position of rest, the following mechanism is provided for cooperation with cams V.

Several counter-weights W, Fig. 3, are provided, respectively connected at top to the right ends of oscillating levers 109, and located in tubular casings 159 on feet 165 of uprights N, Figs. 2–3; the casings 159 being located behind the uprights N. These counter-weights abruptly pull up guide K with desired promptness to provide a bottom support for the continuously advancing unsheared stock Z, as soon as one of the cams V of shear-carrier 34 releases control of lever 109, so that no time is lost after discharge of a sheared sub-length Z1 before guide K is ready in position to support the advancing new van of unsheared stock. As weights W quickly go down and as guide K in its consequent upward movement abuts up against I, the shock of such contact is cushioned by springs 162 between the plungers 161 below the right-hand downwardly moving ends of levers 109, Fig. 3. Springs 162 are adjustable by disks 163 and screws 164; and the associated parts are housed in 160 on uprights N. This arrangement of levers and counter-weights provides positive discharge of sheared sub-lengths by the levers but yielding return of support K by the weights (or springs) such yielding return preventing injuries by sub-lengths possibly jammed between guides I, J, K; and the energy for the return being stored in the weights or springs by the positive discharging drive of the levers. In case of such jam the operator can stop the machine or re-trip to clear the guides.

Shaft 108 for the several levers 109 which support and move bottom-guide K, is journaled, Fig. 3, in the several uprights N of the stock-receiving and discharging apparatus of Fig. 2, shaft 108, Fig. 6 left extending parallel to guides I, J, K, and therefore longitudinally of the machine; and therefore shaft 108 constitutes means aiding to hold said uprights N in place. Uprights N also are held in place by bar 83, Figs. 2–3, and by tube 81, Fig. 2, detachably held to the bed-casting Q by the threaded pipe-flange collar 82, Figs. 1, 6.

The mechanism connected to clutch L by which the clutch is set in operation to rotate tool-carrier 34, Fig. 28, is shown in Fig. 17. The mechanism by which said connecting mechanism is tripped by the forward feeding of the stock Z is shown in Figs. 18–21, and 5, as follows.

A single target trip device X, Figs. 2, 19, 21, is mounted on laterally swinging stock-guide J and slid thereon by the operator into proper position for the production of sheared sub-length Z1 of desired uniform lengths, as indicated, Figs. 18–20, by the scale J1 marked on the top of guide J by the manufacturer of the machine. In the desired position of adjustment this target X is clamped, Figs. 1, 19, by wing-screw 170 and clamping plate 171. The lower end of X is formed with the portion shown inclined in the path of the van of continuously moving stock Z and extending across the path of the continuously advancing stock. When a van end of stock Z strikes said inclined portion of target X it forces X aside and swings the entire length of guide J laterally, Fig. 20, on its said end-supporting-links 99—100, thereby operating the turn-buckle 103—105 and vertical lever 85 to rock the shaft 88. The end of shaft 88 which is nearer the stock guides is journaled at 144A in cowl or shear-housing 114. Shaft 88 extends horizontally, from its end in Fig. 20 to which the lever 85 is connected, to the bearing for its other end at 87, top Fig. 5, where another lever 86 is connected to it to operate clutch L. Rock-shaft 88 then operates as in Fig. 16 to trip the clutch L by lever 86 and start rotation of shear-carrier 34, Figs. 28, 25, by the mechanism of Fig. 16 to be described later.

But in Fig. 20 the parts are shown in their positions before shearing of the stock has been effected by rotation of carrier 34, altho lateral guide J carrying target X has been moved away from the other two guides, i. e. the stationary top guide I and the downwardly movable bottom guide K. As yet there has been no downward movement of guide K or of its pull-down devices 140 because K is yet needed to support the unsheared moving stock Z in position to be sheared.

Furthermore, notwithstanding that guide J has been moved away from guides I and K and from the side of the moving stock, the stock yet is held in the channel or chamber between guides K and I by means of certain holding devices 172 which prevent the stock-van prior to shearing from tending to roll off the inclined upper surface of bottom guide K from under pull-down devices 140, which otherwise the stock might do now that J has been moved to its position of Fig. 20. Thus while guide J normally and during most of the time of continuous stock-feeding, serves as part of the mechanism for holding stock Z in proper feeding position, yet by means of holding devices 172 the guide J is permitted to serve also as a longitudinal and scale-graduated supporting means for target X, both J and X being movable as a unit to start operation of clutch L and rotary shear 34 before actual stock-shearing and therefore before it is time to release the stock from all the longitudinal stock-guides.

Stock-holding devices 172 however, have another function to perform before guide J is swung away from I and K as follows.

Devices 172 consist, Figs. 22, 18, 21, of a clamping member of which the two legs embrace and fit over the top of stationary guide I. One leg of each of devices 172, left, Fig. 21, is pulled into clamping relation with the side of guide I by a wing-screw 173 passing thru the other leg of 172. The clamped leg of each device 172 is notched at 172A, Fig. 22, to extend downward, Figs. 18, 21, around the side of the advancing stock away from guide I, Fig. 21, altho not clamping the stock which is left sufficiently free for its feeding motion. Several of these devices 172 are clamped along the length of guide I. They act, Figs. 18–19, prior to shearing, to keep the van of the stock Z within due bounds in case it is so bowed, i. e., has such a "long bow" that its feeding advance between the stock-guides might force lateral guide J prematurely away from guides I and K, i. e., before the van end of the stock reaches target X, thereby prematurely operating clutch L to start rotation of shear carrier 34, Fig. 28, and cause shearing of too short a stock sub-length. The notched legs 172A, Fig. 18, of stock-holding devices 172, altho they do not act to break the back permanently of any "long-bow" of the stock, yet they are arranged closely enough together to force such long-bow to bend temporarily or resiliently to a more nearly straight condition as the stock passes between their legs 172A and guides I and K, such temporary bending being sufficient to prevent the inherent stock-bow from effecting premature movement of guide J and untimely shear-operation. Such long-bows are liable to exist in cases of imperfect adjustment of the feed-rolls C of the roll-stand and dies E of flier D, as in cases when stock from a new stock-coil being run thru the machine is of different diameter or temper from previous stock, and the operator has not at first succeeded in obtaining such proper adjustments; that is, during the feed of the first scores of feet of stock from the stock-coil on the supply reel.

Lateral stock-guide J, Figs. 18–20, is formed with a plurality of slots or indents as 174 or equivalent construction to provide space to receive the confining legs of devices 172 between guides J and I. When the holding means consists of a plurality of separate devices and the space-providing means is of separate holes or indents as shown, then the latter are equally spaced from one another at comparatively slight distances so as to permit as many or as few of the separate devices 172 to be employed as may be desired. All the several devices 172 act alike and successively on the continuously advancing stock on any long-bowed portion of the length thereof, and there is no reason why the constructor may not unite them in a single holding member held stationary as by being attached to stationary guide I and extending lengthwise of the guides, altho it is not necessary to have parts such as 172A, Fig. 18, extending continuously between stock Z and guide J, it being sufficient, as above, if such intervening parts 172A be located sufficiently close together to prevent a long-bow of the stock from moving guide J prematurely and the separate devices 172 are preferred as being considered now to be the simplest and most convenient embodiment of the stock-holding mechanism.

Fig. 21 illustrates the completion of the discharge of sheared stock, after the going down of bottom-guide K carrying with it the pull-down devices 140 caused by the latter part of the partial shearing-rotation of tool-carrier 34 and one of its cams V. In Fig. 21 the devices 140 have pulled down the sheared sub-length Z1 out of its possibly jammed position between stationary top guide I and restraining leg 172A of holding devices 172; and as shown, sub-length Z1 is free between hook 176 of 140 and K to roll down and off the inclined top surface of bottom-guide K. Holders 172 have remained stationary and have not moved down with devices 140 because they are clamped to stationary top-guide I. Before K, 140 were moved down by rotation of tool-carrier 34, guide J was moved leftward by the engagement with target X of the van end of stock Z before shearing, and for the purpose of starting operation of the shear-mechanism. But after J had been moved leftward, and before K, 140 were moved down, the devices 172 held unsheared stock Z from any leftward movement away from guide I following leftward movement of guide J. And before J had been moved leftward and while stock-holding devices 172 may not have acted to prevent any bowed portions of stock Z from moving J leftward before the van end of the stock had reached target X, said holding devices 172 have served to retain the stock in place adjacent guides I and K. Fig. 21, is a vertical section at 18—18 of the Fig. 2 showing of the right-hand extension of Fig. 1, and in Fig. 21 Z indicates the van end of the long unsheared stock appearing in the background in its progress thru shear-housing 114, Fig. 1 right, this unsheared stock Z passing thru the openings thru the shearing mechanism Fig. 25, after that one of the dies H which has just effected shearing of sub-length Z1, Fig. 21, has been rotated by die-carrier 34 down below the line of stock-feed and stopped so that stock Z, Fig. 24, is passing thru the next opening O which communicates with the next die H. By the time unsheared stock Z has moved rightward, Fig. 1, to enter between guides I, J, K, Figs. 1–2, then guides J, K, Fig. 21, have been moved back into normal relations with stationary guide I, Figs. 18, 19, so that the new van end of Z finds its bottom support on raised bottom guide K, which closes the stock-feeding chamber formed between I and K. One of the holding devices 172 is fixed to stationary guide K at a point close enough to the van end of Z emerging rightwardly from the shear-mechanism, to prevent possible premature movement of guide J and consequent untimely shear operation by a long-bow of the stock so emerging from the shear. In Fig. 21, N indicates the uprights in Figs. 2–3 to which stationary guide I is secured. As above, guide K and pull-down devices 140 are raised back to normal by counter-weights W, Fig. 3.

Guide J and target X, Fig. 21, are moved rightwardly back to normal in the reverse operation of the clutch-control mechanism, Fig. 20, which was operated by their leftward movement away from guides I and K, the rest of this clutch-control mechanism, including rock-shaft 88 of Figs. 20, 16 being shown in Fig. 16, Fig. 16 being an elevation sectioned at 16—16 Fig. 1, and showing clutch L and its tripping mechanism controlled by target X operated by stock Z, Figs. 18–19, 21. The power for this reverse operation of guide J and target X back to their normal stationary positions is furnished by any suitable device such as spring 188, Fig. 16, central right, and Fig. 5, top center, the ends of this spring being anchored at 189, 190, Fig. 16, to stationary support 87 and swinging lever 86. This device always tends to cause levers 85, 86 to turn anti-clockwise, Fig. 16, and thereby push guide J leftward to and hold it in and return it to its normal position close alongside stationary guide I. The object of any van device is to re-establish the normal position of guide J and target X promptly after they have served their purpose of operating the clutch L.

The turn-buckle connection, Figs. 20, 16 between guide J and the two vertical levers 85, 86 on opposite ends of shaft 88 journaled in support 87, includes turn-buckle 105, the oppositely threaded rods 103, 104, and, Fig. 16, the self-alining ball-bearings 102, 107; bearing 102, Fig. 16, being at pivot 101 between J and rod 103, and bearing 107 being at the pivot 106 between rod 104 and lever 85; these self-alining bearings compensating in the transmission of the short arcs of movement from the horizontally swinging guide J to the vertically swinging links 85, 86.

The short sidewise movement of guide J (exaggerated in Fig. 21 for clearness) caused by target X and advancing stock Z is increased to provide as much motion for lever 85 as may be desired, by means of swinging link 100, Fig. 20; that is, the illustrated connection of rod 103 to a point 101 more remote from pivot 186 than pivot 187 causes a greater movement of the turn-buckle connection to lever 85 (at least twice) than the slight movement of guide J caused by target X and advancing stock Z. Shaft 88 in Fig. 20 extends horizontally, Fig. 1, from this right-hand portion (target X, Fig. 2) of the machine to its left-hand bearing 87, Figs. 1, 5, in front of clutch L, and there at this other (left) end of shaft 88 is secured the second lever 86, Fig. 16, being the same length as the first or left lever 85, Figs. 16, 20, but positioned at the right end of the shaft 88. Now, Fig. 16, the swing of levers 85, 86 caused by the movements of stock Z, target X and guide J, is caused to initiate operation of clutch L on 15 normally stationary shaft 42, to drive rotary shear 34, the diametrical relations of clutch-shaft 42 and rotary shear 34 being shown in Figs. 24 and 8, all the parts in Fig. 24 being normally at rest including clutch-shaft 42. The clutch L, Figs. 16, 16A includes as its driving element a normally rotating drum 52 fixed to shaft 42, as its driven element a normally stationary body 55, and a roll-basket 56 carrying locking-rolls 57. Clutch-body 55 is keyed at 54, Figs. 16, 16A, to the normally stationary clutch-shaft 42. Clutch-drum 52 is rotated continuously by fly-wheel gear 51 fixed to it, Figs. 16A, 8, 1, 5, 6; this large gear 51 being driven by pinion 50, Fig. 1, on main shaft T. Roll basket 56, Fig. 16, is formed with two stop-noses 56B, and normally one or the other of these noses abuts against a stop-plunger 69 thereby preventing rotation of clutch-body 55 and its shaft 42. Intermittently the plunger 69 is depressed from in front of stop-nose 56B (by mechanism located between target X, lever 86 and plunger 69) whereupon the stress on torsion clutch-spring 60 is released so that it turns roll-basket 56 so that the locking rolls 57 of the clutch are snapped from their normal non-locking positions shown Fig. 16 to their locking positions shown Fig. 16A where they lie tight between their roll-seats 55C, and the hardened steel lining ring 53, of the rotating clutch-drum 52, all whereby clutch-shaft 42 instantly is started, Fig. 24, to impart to rotary shear 34 the beginning of its partial rotation. The half-rotation of clutch L causes the third-rotation of shear-carrier 34, and is adapted to such small arc.

The clutch-releasing depression of clutch-stop plunger 69, Fig. 16, by stock-target X and lower lever 86 on shaft 88 is effected as follows. The lower end of lever 86 carries tripping-pawl 92. When target X swings guide J laterally and when levers 85, 86 on shaft 88 swing clockwise, then pawl 92 is carried to left and moves detent 67 leftward out of recess 185 in plunger 69 freeing the latter to be pulled down by stretched spring 70 from in front of clutch stop-nose 56B thereby initiating rotation of the clutch and rotary shear-carrier 34.

The duration of the half-rotation of clutch L and of the corresponding resulting third-rotation of shear-carrier 34 is very short, and therefore it is necessary that the normal conditions of the above clutch-controlling parts be restored very promptly in order to prevent over-running of the clutch and shear-carrier. Such restoring operations include (1) an upward movement of plunger 69, Fig. 16, toward the clutch so that before the latter shall have completed a half-rotation the plunger 69 will be restored to its normal position in the path of the second clutch stop-nose 56B: (2) braking mechanism which as nose 56B strikes raised plunger 69 stops movement of the parts of the system between clutch L and revolving shear-dies H, including normally stationary clutch-body 55 fixed to shaft 42, the rotary shear 34 and the gearing between them, so that carrier 34 and its fellow tool-carrier F shall not over-run their normal positions of rest wherein the advancing stock Z freely passes thru their longitudinal perforations and where they are in readiness for their next shearing cycle; (3) mechanism which re-latches stop-plunger 69 in its normal raised position by detent 67; and (4) mechanism insuring that pawl 92 shall be raised duly out of the path of detent 67 before the expiration of the extremely short interval when it is necessary for 67 to move in order duly to re-latch plunger 69 against the tendency of its stretched spring 70 to pull it down prematurely from in front of clutch-nose 56B.

The mechanism for the above raising of stop-plunger 69 to normal clutch-stopping position and thereby stretching its spring 70, Figs. 9, 6 includes a cam 75 fixed on clutch-shaft 42, Fig. 6, in position so that one of its two noses, Fig. 9, operates to raise plunger 69 positively by way of intervening mechanism in time to put it in the path of the second clutch-nose 56B, Fig. 16, and thereby prevent a second stock-shearing operation of the tool-carriers 34, F at a time when the next or unsheared stock-van had been fed along too short a distance beyond the shear. But here, within a half-rotation of clutch L and its shaft 42, a nose of the cam 75 on clutch-shaft 42, Fig. 6, forces down roll 76, Fig. 9, and rod 77 against cam-spring 77S in housing Q1 which spring keeps roll 76 in contact with the surface of cam 75. Rod 77 pivoted to the left end of bell-crank lever 78, Fig. 6, itself pivoted at 80, therefore swings down the left end of lever 78 raising its right end under clutch stop-plunger 69 to raise the latter in front of the second clutch stop-nose 56B.

The mechanism for re-latching plunger 69, Fig 16, includes the compressed spring 68. As soon as plunger 69 has been raised as above to its normal position, so that its notch 185 is in alinement with or very slightly above detent 67, then the latter is pushed rightwardly by spring 68 into said notch 185 thereby re-latching plunger 69, provided detent 67 is free so to move rightwardly.

The mechanism insuring that 69 shall be so free includes, Fig. 16, a guide-roll 95 secured to the back of pawl 92 and by stud 93; and a stationary cam 96 having an interior surface which is traversed by roll 95. The duration of half-rotation of clutch L is so short causing only the one-third rotation of shear-carrier 34, that it is particularly important that pawl 92 be removed promptly from its position constituting a positive obstruction to the free rightward movement of latching-detent 67 for re-latching plunger 69; the hook-end 92A of pawl 92 actually locking detent 67. But by cam 96 the leftward movement of pawl 92 which moves detent 67 out of its latching engagement with stop-plunger 69, causes leftward movement of roll 95 along the inclined cam surface of internal cam 96 so that while pawl 92 thereby is raised comparatively slowly as it moves detent 67 out of notch 185 in plunger 69, yet the instant that detent 67 unlatches plunger 69 and spring 70 pulls 69 down, then the hook-end 92A of pawl 92 is raised above the right upper edge of detent 67, thereby wholly freeing detent 67 to be restored rightward by spring 68 as soon as plunger 69 has been raised as above by cam 75. After detent 67 has been returned rightwardly, pawl 92 is restored to its normal position with its hook 92A engaging the right end of detent 67, that being effected by the rightward movement of pawl 92 carrying its roll 95 down the incline of cam 96, said movement of pawl 92 accompanying the return movements of levers 86, 85 etc. upon the return of stock-guide J to its normal position alongside stock-guides I and K by means of spring 189. In said return of pawl 92 its hook 92A may ride along the top of detent 67 and then drop down along the right end thereof.

The braking mechanism which checks motion of the system lying between fly-wheel-gear 51 and revolving shearing dies H, which includes the rotary shear-carrier 34, the normally stationary clutch-body 55 and the gearing, Fig. 24, between them and shear-shaft 42, comprises, Figs. 5, 6, 8, the parts 61—64 constituting a continuously acting brake on clutch-shaft 42, which, when clutch L is disconnected by the striking of raised plunger 69 by a stop-nose 56B of clutch-body 55, acts substantially instantly to stop the shear-transmission and rotary shear 34 in the position of the latter, Fig. 24, where an advanced portion of one of its circumferential openings O is in line with the continuously feeding stock Z. The effect of said brake is to check the rotation of shear-carrier 34, Figs. 27, 28 while the hill of cam 38 is moving off a suitable member 39C so that carrier 34 comes to rest in such position that the next partial rotation of carrier 34 can be initiated before a new operating engagement of cam 38 with a suitable member 39C causes the longitudinal movement of the two carriers. While the braking mechanism shown as an example is always in operating condition, yet it is not effective in stopping the rotary shear until the latter has been disconnected from clutch L by the abutting of stop-nose 56B of the clutch against plunger 69 just previously raised into the circular path of said nose. When one of the cams 38 has its plateau disengaged from a suitable cooperating member such as 39C by continued revolution of cam 38 then carriers 34 and F are free to be returned leftward by spring S (or equivalent as a weight), i. e., opposite the direction of stock-feed. Such cam plateau disengagement is effected just before clutch-nose 56B strikes plunger 69, and upon the consequent disconnection of clutch-shaft 46 from fly-wheel 51, the band 62 of brake 61—65, previously ready for such action, acts on clutch-shaft 42 to check it promptly; the shear-system driven by shaft 46 having relatively low mass and low moment of inertia, and being in movement for only a one-third rotation of shear-carrier 34 while connected to fly-wheel 51 by clutch L.

As shown, and described above, the rates of the continuous feed of stock Z of the rotation of shear-carrier 34 and of the rightward forward movements of carriers 34 and F all are coordinated with one another so that all three, Z, 34 and F at the instant of shearing of Z by tools G and H will be moving in the same direction and at substantially the same rate.

The various advantages of the invention have been pointed out above in connection with the construction and operation.

I claim:

1. A long-stock rotary shearing machine including mechanism feeding such stock longitudinally, two cooperating adjacent shearing tools reciprocable along the stock-length over a path short relative to the sheared sub-lengths of the long stock; gear-teeth extending generally parallel to the line of stock-feed and arranged in the form of a complete annulus in a plane at right angles to said line; rotatable means centered remote from the line of stock-feed and supporting said tooth-annulus; one of said tools being perforated longitudinally and mounted in said rotatable supporting means intermediate said tooth-annulus and the center of rotation thereof, and in a radial position revolving across the line of stock-feed and completely outside said line; said rotatable supporting means being formed with a perforation extending longitudinally in the line of stock-feed and extending circumferentially oblong from said revolving tool but completely enclosed; and said revolving tool being formed with a lateral stock-passage communicating between its longitudinal perforation and the end of said oblong perforation in the rotatable supporting means; and means rotating said annulus in a single direction.

2. A long-stock rotary shearing-machine including mechanism continuously feeding such stock longitudinally, two cooperatively adjacent and longitudinally reciprocable hollow shearing-dies reciprocable along the stock-length over a path short relative to the sheared sub-lengths of the long stock; gear-teeth extending generally parallel to the line of stock-feed and arranged in the form of a complete annulus in a plane at right angles to said line; rotatable and longitudinally reciprocable means centered remote from the line of stock-feed and supporting said tooth-annulus; one of said shearing-dies being perforated longitudinally and carried by said movable supporting means in position revolving across the line of stock-feed while moving in the direction of such feed and further completely outside said line; stationary supporting means; and driving means mounted on said stationary supporting means and including a gear meshing with said reciprocable and rotatable tooth-annulus and rotating it in a single direction.

3. A long-stock rotary shearing machine including mechanism feeding such stock longitudinally, two cooperatively adjacent shearing tools reciprocable along the stock-length over a path short relative to the sheared sub-lengths of the long stock; gear-teeth extending generally parallel to the line of stock-feed and arranged in a complete annulus in a plane at right angles to said line; and rotatable means centered remote from the line of stock-feed and supporting said tooth-annulus and formed with a circumferentially-closed oblong perforation extending longitudinally in the line of stock-feed; one of said shearing-tools being mounted in said rotatable supporting means at one circumferential side of said oblong perforation and intermediate said tooth-annulus and the center of rotation thereof, and in a radial position revolving across the line of stock-feed and further completely outside said line; and driving mechanism including a gear meshing with said tooth-annulus and rotating the annulus in a single direction.

4. A long-stock rotary shearing machine including mechanism feeding such stock longitudinally, two cooperatively adjacent and longitudinally reciprocable shearing-tools reciprocable along the stock-length over a path short relative to the sheared sub-lengths of the long stock; gear-teeth extending generally parallel to the line of stock-feed and arranged in a complete annulus in a plane at right angles to said line; annulus in a plane at right angles to said line; rotatable and longitudinally reciprocable means centered remote from the line of stock-feed and supporting said tooth-annulus and carrying one of said shearing-tools revolving the same across the line of stock-feed from a position completely outside said line while moving it in the direction of stock-feed; stationary supporting means; and driving mechanism mounted on said stationary supporting means and including a gear meshing with said tooth-annulus and rotating the annulus in a single direction.

5. A long-stock rotary shearing-machine including mechanism continuously feeding such stock longitudinally, two cooperatively adjacent shearing-tools reciprocable along the stock-length over a path short relative to the sheared sub-lengths of the long stock; gear-teeth extending generally parallel to the line of stock-feed and arranged in a complete annulus in a plane at right angles to said line; rotatable and longitudinally reciprocable means centered remote from the line of stock-feed and supporting said tooth-annulus and formed with a circumferentially oblong closed stock-perforation extending longitudinally in the line of stock-feed; one of said shearing-tools being mounted in said movable supporting means at one circumferential side of said oblong perforation and intermediate said tooth-annulus and the center of rotation thereof, and in a radial position revolving across the line of stock-feed from a position completely outside said line; stationary supporting means; and driving mechanism mounted on said stationary supporting means and including a gear meshing with said tooth-annulus and rotating the annulus in a single direction.

6. A long-stock rotary shearing-machine including mechanism continuously feeding such stock longitudinally, cooperatively adjacent and longitudinally reciprocable shearing tools reciprocable along the stock-length over a path short relative to the sheared sub-lengths of the long stock; gear-teeth extending generally parallel to the line of stock-feed and arranged in a complete annulus in a plane at right angles to said line; rotatable and longitudinally reciprocable means centered remote from the line of stock-feed and supporting said tooth-annulus and a plurality of one set of said shearing tools, the latter carried circularly by said supporting means and revolvable thereby successively into shearing relation alongside the cooperating reciprocable shearing tool from a position completely outside of said stock-line; mechanism turning said tooth-annulus in a single direction and simultaneously moving the cooperating shearing toools in the direction of stock-feed; and auxiliary mechanism longitudinally returning said tooth-annulus and all cooperating shearing tools in the opposite direction.

7. A long-stock rotary shearing-machine including mechanism continuously feeding such stock longitudinally, cooperatively adjacent shearing-tools reciprocable along the stock-length over a path short relative to the sheared sub-lengths of the long stock; gear-teeth extending generally parallel to the line of stock-feed and arranged in a complete annulus in a plane at right angles to said line; rotatable and longitudinally reciprocable means centered remote from the line of stock-feed and supporting said tooth-annulus and a plurality of one set of said shearing tools the latter carried circularly by said supporting means and revolvable thereby successively into shearing relation alongside the other cooperating reciprocable shearing tool from positions completely outside said stock-line; mechanism turning said tooth-annulus in a single direction and simultaneously moving the cooperatting shearing tools forwardly in the direction of stock-feed; auxiliary mechanism longitudinally returning said tooth-annulus and both cooperating shearing tools in the opposite direction; and stationary means supporting said turning, forwardly moving and auxiliary returning mechanisms and preventing revolution of the shearing-tool which cooperates successively with the plurality of revolving tools.

8. A long-stock rotary shearing machine including mechanism continuously feeding such stock longitudinally, two tool-carriers one rotatable transversely of the line of stock-feed and both reciprocable along the stock-length over a path short relative to the sheared sub-lengths of the long stock; shearing tools carried respectively by said carriers, the tool on the rotatable carrier being revolvable across the line of stock-feed in shearing relation alongside the tool of the other reciprocable carrier; driving mechanism moving both carriers longitudinally forward in the direction of stock-feed while rotating the rotatable carrier; and energy-storing means yieldingly resisting said forward longitudinal movements and by means of the energy stored thereby moving both carriers longitudinally backward after the completion of their said forward movements.

9. A long-stock rotary shearing-machine including mechanism continuously feeding such stock longitudinally, cooperatively adjacent shearing tools reciprocable along the stock-length over a path short relative to the sheared sub-lengths of the long stock; gear-teeth extending generally parallel to the line of stock-feed and arranged in a complete annulus in a plane at right angles to said line; rotatable and longitudinally reciprocable means centered remote from the line of stock-feed and supporting said tooth-annulus and a plurality of one set of said shearing tools the latter being carried circularly by said supporting means and revolvable thereby successively into shearing relation alongside the cooperating reciprocable shearing-tool from positions completely outside said stock-line; stationary supporting means; and mechanism mounted on said stationary supporting means and including a gear meshing with said tooth-annulus and rotating the same in a single direction.

10. A long-stock rotary shearing machine including mechanism continuously feeding such stock longitudinally, cooperatively adjacent shearing tools reciprocable along the stock-length over a path short relative to the sheared sub-lengths of the long stock; gear-teeth extending generally parallel to the line of stock-feed and arranged in a complete annulus in a plane at right angles to said line; rotatable and longitudinally reciprocable means centered remote from the line of stock feed and supporting said tooth-annulus and a plurality of one set of said shearing tools the latter being carried circularly by said supporting means and revolvable successively into shearing relation alongside the cooperating reciprocable shearing tool from positions completely outside said stock-line; stationary supporting means; mechanism mounted on said stationary supporting means and including a gear meshing with said tooth-annulus rotating it in a single direction, and including mechanism moving the latter and its plural tools and their cooperating tool forwardly in the direction of stock-feed; and mechanism bearing on said stationary supporting means and longitudinally returning said tooth-annulus and all cooperating tools in the opposite direction.

11. A long-stock rotary shearing machine including mechanism continuously feeding such stock longitudinally, cooperatively adjacent shearing tools reciprocable along the stock-length over a path short relative to the sheared sub-lengths of the long stock; gear-teeth extending generally parallel to the line of stock-feed and arranged annularly in a plane at right angles to said line; rotatable and longitudinally reciprocable supporting means supporting said tooth-annulus and a plurality of one set of said cooperating tools the latter being perforated longitudinally and carried circularly by said movable supporting means in positions intermediate said tooth-annulus and the center of rotation thereof and revolvable by said rotatable supporting means successively into shearing relation alongside the cooperating reciprocable shearing-tool; said rotatable supporting means being formed with a plurality of perforations extending longitudinally in the line of stock-feed and circumferentially oblong from said revolving perforated dies respectively; and said revolving dies being formed respectively with lateral stock-passages communicating between their longitudinal perforations and said oblong perforations in the rotatable supporting means; mechanism turning said tooth-annulus and simultaneously moving it and the cooperating shearing tools in the direction of stock-feed; and auxiliary mechanism longitudinally returning said tooth-annulus and cooperating shearing dies in the opposite direction.

12. A long-stock rotary shearing machine including mechanism feeding such stock longitudinally; cooperatively adjacent shearing tools reciprocable along the stock-length over a path short relative to the sheared sub-lengths of the long stock; gear-teeth extending generally parallel to the line of stock-feed and arranged in an annulus in a plane at right angles to said line; rotatable supporting means supporting said tooth-annulus and a plurality of one set of said cooperating tools, the latter being perforated longitudinally for stock-passage and carried circularly by said rotatable supporting means in positions revolvable successively thereby into shearing relation alongside the cooperating shearing tool; said rotatable supporting means being formed with a plurality of stock-perforations extending longitudinally in the direction of stock-feed and also extending circumferentially oblong from said revolving perforated tools respectively; said revolving perforated tools being formed respectively with lateral stock-passages communicating between their own longitudinal perforations and said oblong perforations in the rotatable supporting means; and mechanism turning said tool-annulus; said rotary supporting means being formed with clearance entrances which in the direction of rotation lie rearwardly of said revolving tools respectively and receive the van end of stock advancing after shearing and before the rotary supporting means has carried its perforations in front of the stock-van.

13. A long-stock rotary shearing machine including mechanism feeding such stock longitudinally; cooperatively adjacent shearing tools reciprocable along the stock-length over a path short relative to the sheared sub-lengths of the long stock; gear-teeth extending generally parallel to the line of stock-feed and arranged annularly in a plane at right angles to said line; rotatable and longitudinally reciprocable means supporting said tooth-annulus and a plurality of one set of said cooperating tools, said plural tools being perforated longitudinally for stock-passage and carried circularly by said movable supporting means in positions revolvable successively thereby into shearing relation alongside the cooperating reciprocable tool; said movable supporting means being formed with a plurality of stock perforations extending longitudinally in the line of stock-feed and also extending circumferentially oblong from said revolving perforated dies respectively; said revolving perforated tools being formed respectively with lateral stock-passages communicating between their own longitudinal perforations and said oblong perforations in the rotatable supporting means; stationary supporting means; and mechanism supported thereby and turning said tooth-annulus and tool-supporting means simultaneously.

14. A long-stock rotary shearing machine including mechanism continuously feeding such stock longitudinally; shear-supporting means extending parallel with the line of stock-feed; two normally stationary tool-carriers supported by said supporting means and reciprocable longitudinally along said supporting means and stock-length over a path short relative to the sheared sub-lengths of the long stock, one of said carriers being rotatable; driving mechanism including a clutch, said clutch being supported independently of said carrier-supporting means; and mechanism intermittently connecting and disconnecting said clutch; said driving mechanism by means of the clutch-connection moving both tool-carriers longitudinally forward in the direction of stock-feed while rotating the rotatable carrier; and energy-storing means yieldingly resisting said forward longitudinal movements and by means of the energy stored thereby moving both carriers longitudinally backward to their normal stationary positions after the disconnection of the clutch.

15. A long-stock rotary shearing machine including mechanism feeding such stock longitudinally; cooperatively adjacent shearing tools; reciprocable along the stock-length over a path short relative to the sheared sub-lengths of the long stock; gear-teeth extending generally parallel to the line of stock-feed and arranged annularly in a plane at right angles to said line; and rotatable means supporting said tooth-annulus and a plurality of one set of said cooperating tools, such plural tools being perforated longitudinally and carried circularly by said rotatable supporting means in positions radially intermediate said tooth-annulus and the center of rotation thereof and revolvable by said supporting means successively into shearing relation alongside the cooperating reciprocable shearing-tool; said rotatable supporting means being formed with a plurality of perforations extending horizontally in the line of stock-feed and oblong in circular arc.

16. A long-stock rotary shearing machine including mechanism continuously feeding such stock longitudinally; shear-supporting means extending parallel with the line of stock-feed; shearing mechanism including two normally stationary tool-carriers and carried by said supporting means reciprocably along the stock-length over a path short relative to the sheared sub-lengths of the long stock; driving mechanism simultaneously causing longitudinal movements of both of said carriers and rotating one of them in a single direction; said driving mechanism including a shaft and a continuously rotating heavy fly-wheel and an intermittently acting clutch both carried by said shaft; and stationary means supporting said shaft.

17. A long-stock rotary shearing machine including mechanism continuously feeding such stock longitudinally; shear-supporting means extending parallel with the line of stock-feed; shearing mechanism including two normally stationary tool-carriers carried by said supporting means reciprocably along the stock length over a path short relative to the sheared sub-lengths of the long stock; driving mechanism simultaneously causing longitudinal movements of both of said tool-carriers and rotating one of them, said driving mechanism including an intermittently acting clutch; and stationary means supporting said driving mechanism; said supporting means parallel to the stock line and supporting said rotary carrier constituting the center of rotation of the latter at a line remote from said stock-line.

18. A long-stock rotary shearing machine including mechanism continuously feeding such stock longitudinally; shear-supporting means extending parallel with the line of stock-feed; shearing mechanism including two tool-carriers and a single gear rotating one of them and all carried by said supporting means reciprocably along the stock length over a path short relative to the sheared sub-lengths of the long stock; mechanism driving said single gear and rotatable tool-carrier; mechanism causing longitudinal movements of both of said tool-carriers by means of the rotation of the rotary carrier; and stationary supporting means for said driving means.

19. A long-stock rotary shearing-machine including mechanism feeding such stock longitudinally; two tool-carriers one of which is rotatable transversely of the line of stock-feed; and both of which are reciprocable along the stock-length over a path short relative to the sheared sub-lengths of the long stock; cooperating hollow shearing dies respectively carried thereby; said rotary carrier being formed with a longitudinal tool-perforation in line with the stock-feed, and its die being fixed in said perforation and not only longitudinally perforated but formed with a lateral opening leading to its said hollow interior; said carrier being normally stationary and its said hollow die being located in it in normal position remote from the stock and from the cooperating relatively stationary shearing die but revolvable by the rotary carrier into positions alongside said cooperating die and across the stock; and mechanism rotating said rotary carrier and including an intermittently acting clutch; said rotary carrier being formed with a longitudinal stock-perforation communicating with said lateral opening in its hollow shearing-die and extending forwardly thereof in the direction of revolution of the hollow die; and the stock in said normally stationary positions of the rotary carrier and its die extending thru a forward portion of said stock-perforation; all whereby upon action of the clutch the carrier is rotated freely before the shearing die engages the stock, thereby separating the starting load on the clutch from the shearing load thereon.

20. A long-stock rotary shearing machine including mechanism continuously feeding such stock longitudinally; two tool-carriers respectively carrying cooperating shearing tools, one of said carriers being rotatable in a plane at right angles to the line of stock-feed, and both carriers being reciprocable longitudinally along the stock-length over a path short relative to the sheared sub-lengths of the long stock; mechanism rotating said rotary carrier in a single direction and including an intermittently acting clutch; and mechanism moving both carriers forward longitudinally in the direction of the stock-feed, said mechanism being constructed and arranged for initiation of its said operation by the momentum of said rotary carrier and its intermittently acting mechanism at a time after commencement of their rotary movement.

21. A long-stock shearing machine including mechanism continuously feeding such stock longitudinally; two normally stationary tool-carriers respectively carrying cooperating shearing tools, both carriers being reciprocable longitudinally of the stock over a path short relative to the sheared sub-lengths of the long stock; and one of them being movable transversely of the stock and its tool being carried in position remote from the stock during their normal stationary positions but movable to shearing position across the stock and alongside the cooperating tool; mechanism including an intermittently acting clutch and moving said transverse movable tool toward the stock and across the same for shearing; and mechanism moving both tool-carriers and their tools longitudinally during engagement with the stock of the tool on the transverse carrier; said mechanism being constructed and arranged for initiation of its operation by the movements of said transverse carrier and its intermittently operating mechanism after the commencement of said movements and by the momentum of said carrier and its said operating mechanism.

22. A long-stock rotary shearing machine including a main frame, mechanism supported by the frame and continuously feeding the long stock longitudinally; a stationary tool-carrier support itself supported by the frame; two cooperating tool-carriers supported by said carrier-support and reciprocable along the stock-length over a path short relative to the sheared sub-lengths of the long stock; one of said carriers being rotatable transversely, and carrying peripheral driving teeth; mechanism including a bodily stationary member and causing movements of the two tool-carriers in the direction of stock-feed by means of the rotation of said rotatable carrier; stationary means holding the other tool-carrier from rotation; and driving mechanism supported by said frame in fixed position relative to the tool-carriers and including a gear engaging said peripheral teeth of the rotatable tool-carrier and rotating the latter in a single direction.

23. Mechanism for shearing continuously fed long stock while in longitudinal feeding motion which comprises a tool-carrier support extending parallel to the line of stock-feed; two tool-carriers supported by said support, said carriers being reciprocable along the stock-length over a path short relative to the sheared sub-lengths of the long stock; carrying cooperating shearing tools, and formed with longitudinal passages for the moving stock, one of said carriers being also rotatable transversely of the line of stock-feed; the stock-passages in and the shearing tools on the rotatable carrier being pluralized, the longitudinal passages in said carrier being also oblong circumferentially, and the plural tools respectively having hollow centers communicating with the circumferential rear ends of said oblong stock-passages, said revolving tools having lateral stock-passages leading to their longitudinal passages; and mechanism normally holding the rotatable carrier in a stationary position wherein the forward ends of said oblong stock-passages lie in the line of stock-feed and their rear ends lie remote from said line.

24. A long-stock rotary shearing machine including mechanism continuously feeding such stock longitudinally; a tool-carrier located in the path of the moving stock and rotatable transversely thereof; a support for said rotatable carrier, said support extending along the path of stock movement and fixed against longitudinal movement; a second tool-carrier also supported by said support; means holding said second carrier from rotation, both carriers being reciprocable along the stock-length over a path short relative to the sheared sub-lengths of the long stock; mechanism including a bodily stationary member causing movement of both carriers along their said support in the direction of stock-movement by means of rotation of the rotatable carrier; and means which independently of rotation of the rotatable carrier returns the two carriers in the direction opposite to that of the moving stock.

25. A rotary shearing machine for shearing continuously fed long stock while in longitudinal feeding motion which includes a support extending parallel to the line of stock-feed and fixed against longitudinal movement; two tool-carriers supported thereby and formed with passages for such stock and reciprocable along the stock-length over a path short relative to the sheared sub-lengths of the long stock; one of said carriers being also rotatable about the center of its said support as an axis of rotation and having plural longitudinal circumferentially oblong stock-passages; a plurality of longitudinally hollow shearing tools supported by said rotatable carrier and having their hollow interiors in communication respectively with said oblong stock-passages thru said carrier; mechanism moving both carriers in the direction of stock movement and simultaneously turning the rotatable carrier thru a partial rotation effecting stock-shearing action by one of the revolving tools and bringing the next oblong stock-passage into the path of the continuously moving stock; and mechanism additional to said operating mechanism and returning the two carriers in a direction opposite to that of the moving stock.

26. A long-stock rotary shearing-machine including mechanism continuously feeding such stock longitudinally, a tool-carrier; a longitudinally extending support therefor, said carrier being rotatable transversely about the center of said support as an axis of rotation; a second normally stationary and cooperating tool-carrier also supported by said support, both carriers being reciprocable along the stock-length over a path short relative to the sheared sub-lengths of the long stock; driving mechanism causing operation of said rotatable carrier; a stationary supporting means for said driving mechanism; and driving mechanism including a member also supported by said stationary supporting means and causing movements of both tool-carriers in the direction of stock-movement by means of the rotation of the rotatable carrier.

27. A long-stock rotary shearing machine including mechanism continuously feeding such stock longitudinally, a tool-carrier; a longitudinally extending support therefor mounted remote from the line of stock-feed, said carrier being transversely rotatable about the center of said support as an axis of rotation; a second and cooperating tool-carrier also supported by said support but carrying a tool in alinement with the stock; both tool-carriers being reciprocable along the stock-length over a path short relative to the sheared sub-lengths of the long stock; driving mechanism causing operation of said carriers; stationary supporting means for said driving mechanism; and means connecting the two carriers together for simultaneous reciprocation.

28. A long-stock rotary shearing machine including mechanism continuously feeding such stock longitudinally, a rotatable driven member carrying a revolvable shearing-tool; a longitudinally extending support therefor extending parallel to the line of stock-feed, said rotatable member being transversely rotatable about the center of said support as an axis of rotation remote from said stock-line; a second and cooperating tool-carrier also supported by said support in position alongside said driven rotatable member; means holding said two carriers together for simultaneous reciprocation; both said rotatable member and cooperating tool-carrier being reciprocable along the stock-length over a path short relative to the sheared sub-lengths of the long stock; driving mechanism causing operation of said rotary driven member and cooperating tool-carrier; means holding said co-operating tool-carrier from rotation by said rotatable member; and stationary supporting means for said driving mechanism and holding means.

29. A long-stock shearing machine including mechanism feeding the long stock longitudinally, shearing mechanism including three members located in succession in the line of stock-feed and normally close to one another laterally; one member being a stationary control-member, the second or intermediate member being a tool-carrier reciprocable in the line of stock-feed away from the stationary member, and the third being a second and cooperating tool-carrier, said second and third members being reciprocable along the stock-length over a path short relative to the sheared sub-lengths of the long stock; said third member being also rotatable transversely of the line of stock-feed independently of the intermediate member; said stationary and third members having cams extending toward one another and respectively staggered, the cams of the two members normally lying in circumferentially alternating relations to one another, and the intermediate member normally lying radially inward of the cams of both the first and second members; means holding the intermediate member laterally adjacent the third member in position radially inward of the cams of the latter; locking means cooperating between the stationary and intermediate member holding the latter from rotation by the third member; and mechanism rotating said third member.

30. A long-stock shearing-machine including mechanism feeding the long stock longitudinally, shearing mechanism comprising three members located in succession in the line of stock feed and normally adjacent one another laterally; one being a stationary control-member, the second and intermediate member being a tool-carrier reciprocable in the line of stock-feed away from the stationary member, and the third member being a second and cooperating tool-carrier, both said second and third members being reciprocable along the stock-length over a path short relative to the sheared sub-lengths of the long stock; said third member being rotatable transversely of the line of stock-feed, and also having peripheral gear-teeth; driving mechanism including a gear engaging the teeth on said rotatable tool-carrier; means supporting said driving mechanism and gear independently of the reciprocation of the two tool-carriers; means holding the two tool-carriers laterally adjacent one another for reciprocation as unit; mechanism cooperating between the stationary member and the rotatable tool-carrier causing reciprocation of both carriers by means of the rotation of the rotatable carrier; and means cooperating between the stationary member and the intermediate member and holding the latter from rotation by the rotatable tool-carrier held adjacent said intermediate member.

31. A long-stock rotary shearing-machine including mechanism continuously feeding such stock longitudinally, two cooperating tool-carriers reciprocable along the stock-length over a path short relative to the sheared sub-lengths of the long stock; one of said carriers being transversely rotatable; forwardly-driving mechanism intermittently moving the tool-carriers in the direction of stock-movement and simultaneously causing turning of the rotatable carrier for shearing action on the moving stock; and rearwardly-driving mechanism intermittently returning both carriers in a direction opposite to the moving stock.

32. A long-stock rotary shearing-machine including mechanism continuously feeding such stock longitudinally, a transversely rotatable tool-carrier; a support for said rotatable carrier; the center of which support is the axis of rotation of the carrier and remote from the line of stock-feed; a second and cooperating tool-carrier also centrally supported on said tool-carrier-support; both carriers being reciprocable along the stock-length over a path short relative to the sheared sub-lengths of the long stock; two cooperating shearing tools respectively mounted on said carriers for shearing action alongside on another when the shearing tool on the rotatable carrier is revolved thereby across the path of the stock; driving mechanism causing operation of said tool-carriers in shearing reciprocation and rotation and in coordinated time relation with the stock-feed; and stationary supporting means for said driving mechanism.

33. A long-stock rotary shearing machine including mechanism continuously feeding such stock longitudinally, a tool-carrier support extending longitudinally; two tool-carriers supported thereby and both reciprocable along the stock-length over a path short relative to the sheared sub-lengths of the long stock; one of said carriers being rotatable transversely; two cooperating shearing tools respectively mounted in said carriers for shearing action alongside one another when the shearing tool on the rotatable carrier is revolved thereby across the path of the stock; driving mechanism causing operation of one of said tool-carriers in timed relation to the feeding mechanism; driving mechanism causing the operation of said carrier to operate the other in timed relation to the feeding mechanism; and stationary supporting means for both said driving mechanisms.

34. A long-stock rotary shearing-machine including mechanism continuously feeding such stock longitudinally, a stationary longitudinally extending tool-carrier support; and two tool-carriers both reciprocable along the stock-length over a path short relative to the sheared sub-lengths of the long stock; and one transversely rotatable about the center of said tool-carrier support as an axis of rotation; two cooperating shearing tools respectively mounted in said carriers for shearing action alongside one another when the shearing tool on the rotatable carrier is revolved thereby across the path of the stock; driving mechanism operating said carriers in timed relation to the stock-feeding mechanism; and stationary supporting means for said driving mechanism.

35. A long-stock rotary shearing-machine including mechanism continuously feeding such stock longitudinally, two cooperating tool-carriers; a support for said carriers and fixed against longitudinal movement, both carriers being reciprocable along the stock-length over a path short relative to the sheared sub-lengths of the long stock; but one carrier being also rotatable transversely; two cooperating shearing tools respectively mounted in said carriers for shearing action alongside one another when the shearing tool on the rotatable carrier is revolved thereby across the path of the stock; driving mechanism operating the carriers in timed relation with the stock-feeding mechanism; said driving mechanism including means causing reciprocation of both carriers by rotation of the rotatable carrier; and stationary supporting means for driving mechanism.

36. A long-stock rotary shearing machine including mechanism continuously feeding such stock longitudinally, two tool-carriers both reciprocable along the stock-length over a path short relative to the sheared sub-lengths of the long stock; and one of said carriers being rotatable transversely; a support for both carriers; driving mechanism causing operation of the rotary carrier in timed relation with the stock-feeding mechanism; driving mechanism causing reciprocation of both carriers in timed relation with the stock-feeding mechanism by means of the movement of the rotary carrier; and stationary means supporting both said driving mechanisms.

37. A long-stock shearing machine including mechanism continuously feeding such stock longitudinally, two cooperating tool-carriers; a support for both carriers, both being reciprocable along the stock-length over a path short relative to the sheared sub-lengths of the long stock; and one being also transversely rotatable and combined with peripheral construction for rotating it; said carrier support being mounted parallel to and remote from the line of stock-feed, and the two carriers being centrally mounted on said support; driving mechanism causing movements of both carriers along said remote support in the direction of stock-movement simultaneously with the rotation of the rotatable carrier by its said driving periphery; and stationary means supporting said driving mechanism.

38. A long-stock rotary shearing machine including mechanism continuously feeding such stock longitudinally, a tool-carrier support extending parallel to the line of stock-feed and remote therefrom; a combined transversely rotatable tool-carrier and gear supported by said support; a second and cooperating tool-carrier also centrally supported by said support, both carriers being reciprocable along the stock-length over a path short relative to the sheared sub-lengths of the long stock; two cooperating shearing tools respectively mounted in said carriers for shearing action alongside one another when the shearing tool on the rotatable carrier is revolved across the path of the stock; driving mechanism operating said tool-carriers in timed relation with the stock-feeding mechanism; and stationary supporting means for said driving mechanism.

39. A long-stock rotary shearing machine including mechanism feeding the stock longitudinally, two cooperating shearing tools one of which is revolvable across the line of stock-feed reciprocable along the stock-length over a path short relative to the sheared sub-lengths of the long stock; gear teeth extending generally parallel to the line of stock-feed and arranged in a plane at right angles thereto in a complete circle of greater radius than the distance between the revolving tool and its center of revolution; supporting means for said teeth and revolving tool connecting them together for simultaneous revolution, said supporting means being formed with a longitudinal and circumferentially oblong stock-passage; and a shaft supporting said connecting means, the latter being rotatable about the center of said shaft as an axis of rotation, said shaft being mounted parallel to but remote from the line of stock-feed.

40. A long-stock rotary shearing machine including mechanism continuously feeding such stock longitudinally, two cooperating tools both reciprocable along the stock-length over a path short relative to the sheared sub-lengths of the long stock; and one of said tools transversely revolvable; stationary supporting means; carriers for said tools, one being rotatable and carrying said revolvable tool; a longitudinally extending support for said carriers and mounted on said stationary supporting means, said rotary carrier being rotatable about the center of said support as an axis; said carrier-support extending longitudinally and parallel to but remote from the line of stock-feed; and said revolvable tool being mounted on its rotary carrier in position normally wholly outside the line of stock-feed; a shaft rotatively mounted on said stationary supporting means and in position paralleling said carrier-support; and mechanism driven by said shaft and operating said tool-carriers.

41. A long-stock rotary shearing machine including mechanism continuously feeding such stock longitudinally; two cooperating shearing tools one revolvable transversely and both reciprocable along the stock-length over a path short relative to the sheared sub-lengths of the long stock; a separate carrier for each tool, the carrier for the revolvable tool being rotatable; means connecting the two carriers together for longitudinal reciprocation as an operative unit; and a common support for both carriers about the center of which support said rotatable carrier rotates as an axis of rotation, said center being sufficiently remote from the line of stock-feed to revolve the tool completely out of said line; driving mechanism operating said tool-carriers; and stationary means supporting said driving mechanism.

42. A long-stock rotary shearing machine including mechanism continuously feeding such stock longitudinally; two cooperating tool-carriers both reciprocable along the stock-length over a path short relative to the sheared sub-lengths of the long stock; a longitudinally extending support for both carriers about the center of which support one of the carriers rotates as an axis of rotation, said center being sufficiently remote from the line of stock-feed to revolve the tool completely out of said line; driving mechanism operating said carriers; and stationary means supporting said driving mechanism.

43. A long-stock rotary shearing machine including mechanism continuously feeding such stock longitudinally; two cooperating tool-carriers, both reciprocable along the stock-length over a path short relative to the sheared sub-lengths of the long stock; a shaft supporting said carriers, one of them being rotatable about the center of said shaft as an axis of rotation; two cooperating shearing tools respectively mounted in said carriers for shearing action alongside one another when the shearing tool on said rotatable carrier is revolved thereby across the stock; operated driving mechanism controlling the cooperation of the shearing tools in timed relation to the stock-feeding mechanism; and stationary supporting means for said driving mechanism.

44. A long-stock rotary shearing machine including mechanism continuously feeding such stock longitudinally, two cooperating tool-carriers; a support for one of said carriers, said supported carrier being rotatable about the center of said support as an axis of rotation; the other carrier also being supported by said carrier-support, the tool on said other carrier being mounted normally entirely out of line with the revolvable tool on the rotary carrier; both carriers being reciprocable along the stock-length over a path short relative to the sheared sub-lengths of the long stock; driving mechanism causing operation of both carriers; and means other than said carrier-support and stationary and on which said driving mechanism is supported.

45. A long-stock rotary shearing machine including mechanism feeding such stock longitudinally, tool-carriers reciprocable along the stock-length over a path short relative to the sheared sub-lengths of the long stock; one of said carriers being rotatable transversely but normally held in position wherein its tool is remote from the stock, the center of rotation of the carrier being a substantial distance away from the stock and the tool being revolved by the carrier in a circle of which the periphery passes thru the stock; and means rotating said carrier, said mounting of the latter and its tool relative to the line of stock-feed being such that upon revolution of the tool the latter strikes the stock during the downward portion of tool-revolution.

46. A long-stock rotary shearing machine including mechanism feeding such stock longitudinally, two tool-carriers reciprocable along the stock-length over a path short relative to the sheared sub-lengths of the long stock; one of said carriers being rotatable transversely; a plurality of tools carried thereby, and a roll-locking clutch intermittently causing fractional rotations of said rotatable carrier.

47. A long-stock rotary shearing machine including mechanism continuously feeding such stock longitudinally, two cooperating tool-carriers both reciprocable along the stock-length over a path short relative to the sheared sub-lengths of the long stock; and one of said carriers being rotatable transversely; a stationary support; an intermittently operating clutch supported thereby; and mechanism operated by said clutch and first starting rotation of the rotary carrier and thereafter starting longitudinal movement of both carriers in the direction of the feeding movement of the stock.

48. A long-stock rotary shearing machine including mechanism continuously feeding such stock longitudinally, two light-weight concentric tool-carriers one of which is rotatable transversely and both of which are reciprocable along the stock-length over a path short relative to the sheared sub-lengths of the long stock; a support for said concentric carriers, the rotary carrier being rotatable about the center of said support as an axis of rotation and the tool on the other carrier being mounted thereon remote from said axis of rotation; stationary supporting means; a continuously rotating fly-wheel; and a clutch; said fly-wheel and clutch being carried by said stationary supporting means and intermittently operating both said tool-carriers.

49. A long-stock shearing machine including mechanism feeding such stock longitudinally, normally stationary shearing mechanism intermittently operating on such stock and reciprocable along the stock-length over a path short relative to the sheared sub-lengths of the long stock; a clutch; a target device normally lying in the path of stock-feed and movable by the advancing stock; and operating mechanism between the target device and the clutch and including means amplifying the movement of the target device caused by the advancing stock.

50. A long-stock shearing machine including mechanism feeding such stock longitudinally, normally stationary shearing mechanism intermittently operating on such stock and reciprocable along the stock-length over a path short relative to the sheared sub-lengths of the long stock; a clutch; stock-guiding means extending longitudinally beyond said shearing mechanism in the direction of stock-feed, said guiding means including fixed and movable members; a target device carried by said movable member and normally lying in the path of the advancing stock; operating means between the target device and the clutch; and means carried by said fixed guiding member and holding the stock from premature movement of said target device and movable member.

51. A long-stock shearing machine including mechanism feeding the stock longitudinally, normally stationary shearing mechanism intermittently operating on such stock and reciprocable along the stock-length over a path short relative to the sheared sub-lengths of the long stock; a clutch; stock-guiding means extending longitudinally beyond said shearing mechanism in the direction of stock-feed, said guiding means including a fixed member and two movable members; a target device carried by one of said movable members and normally lying in the path of the advancing stock; operating mechanism between the target device and the clutch; means on said fixed guiding member holding the stock from premature movement of said target device and movable member; and said other movable member having portions embracing and holding the stock to it; and mechanism operated by said shearing mechanism and positively forcing said movable member and a sheared portion of the stock supported thereby from the path of stock-feed.

52. A long-stock rotary shearing machine including stationary supporting means, pinch-feed rolls mounted thereon and continuously feeding such stock longitudinally; two cooperating tool-carriers both reciprocable longitudinally over a path short relative to the sheared sub-lengths of the long-stock, one of said carriers being also rotatable transversely; a cam extending toward said pinch-rolls from the lateral face of the rotary carrier and in a position radially beyond the cooperating tool-carrier; means holding said tool-carriers together for longitudinal reciprocation as an operating shearing unit; means preventing rotation by the rotary carrier of the cooperating carrier and located between the pinch-rolls and the carriers; and means also located between said pinch-rolls and the carriers and cooperating with the cam on the rotary carrier causing longitudinal forward movement of both tool-carriers by means of the operation of the rotary carrier.

53. A long-stock shearing machine including two cooperating shearing tools reciprocable along the stock-length over a path short relative to the sheared sub-lengths of the long stock; mechanism feeding such stock longitudinally to said tools and including two pairs of pinch-feed rolls and a plurality of pairs of staggered feed-rolls and mounted independently thereof between said pairs of pinch-rolls; mechanism positively rotating all said feed-rolls in coordinated time-relation with said shearing mechanism; and means supporting said power-driven intervening feed-rolls, supporting means being movable transversely from the line of stock-feed, independently of supports for said pinch-rolls.

54. A long-stock shearing machine including mechanism feeding such stock longitudinally; two cooperating shearing tools reciprocable along the stock-length over a path short relative to the sheared sub-lengths of the long stock; a frame on which said feeding mechanism and shearing tools are supported; a longitudinal main shaft and a cooperating worm-reduction drive; and operating mechanism between said feeding mechanism and shearing tools respectively, said feeding mechanism being removable from said frame without disturbing the main shaft or the worm-reduction drive.

55. A long-stock shearing machine including mechanism feeding such stock longitudinally, shearing mechanism; mechanism located beyond the shearing mechanism in the direction of stock-feed, extending longitudinally and receiving the van of the stock to be sheared, said receiving mechanism including a fixed longitudinally extending member holding the stock from lateral movement before shearing, and including a longitudinal stock supporting member movable downwardly and carrying means extending over the top of the stock; and mechanism operated by the shearing mechanism and moving said downwardly movable stock-supporting member and the stock downwardly after shearing.

56. A long-stock rotary shearing machine including mechanism continuously feeding such stock longitudinally, shearing mechanism including two tool-carriers both reciprocable along the stock-length over a path short relative to the sheared sub-lengths of the long stock; one of said carriers being also rotatable transversely; mechanism rotating said rotary carrier; mechanism including an external cam and causing such carrier-rotation to produce simultaneous longitudinal forward movement of both carriers in the direction of stock-feed; and energy-storing mechanism resisting but yielding to said forward movement and longitudinally returning said carriers rearwardly in the opposite direction when the rotatable carrier has been rotated beyond and out of the influence of said external cam.

57. A long-stock shearing machine including mechanism feeding such stock longitudinally, shearing mechanism reciprocable along the stock-length over a path short relative to the sheared sub-lengths of the long stock; movable stock-supporting mechanism extending longitudinally beyond the shearing mechanism in the direction of stock-feed for reception and support of the advancing stock prior to and during shearing and including means positively forcing a sheared-off sub-length of stock out of the path of the advancing long stock before completion of shearing; yieldable, energy-storing mechanism normally holding said forcing means in operative relation to the advancing stock prior to shearing; and positively driven mechanism intermittently operating said forcing means and storing energy in said yielding means which upon discharge of the sub-length tends to restore the forcing means yieldingly in operative relation to the remaining long stock advancing for the next shearing.

58. A long-stock shearing-machine including mechanism feeding such stock longitudinally, shearing mechanism reciprocable along the stock-length over a path short relative to the sheared sub-length of the long stock; an intermittently operated clutch driving the shearing mechanism; and mechanism located beyond the shearing mechanism in the direction of stock-feed and receiving and supporting the van of the stock to be sheared, said receiving mechanism including three members, one receiving member extending longitudinally at top and fixed, the second receiving member located at one side of the advancing stock and having a portion normally extending into the path of the stock as a target trip for the clutch, and the third receiving member extending longitudinally below the line of stock-feed in position supporting the stock during shearing but movable just after stock-shearing; motion amplifying operating mechanism connecting the target trip and clutch; means cooperating with said fixed receiving member and before shearing holding the stock in its longitudinal feeding position against movement; mechanism operated by the movement of the shearing mechanism and moving said bottom-receiving member after shearing; and means cooperating with said bottom-member and moving the sheared stock with the latter out of the path of stock-feed.

59. A long-stock rotary shearing machine including mechanism feeding such stock longitudinally, two die-carriers one of which is rotatable transversely; and both of which are reciprocable along the stock-length over a path short relative to the sheared sub-lengths of the long stock; shearing dies respectively mounted in said carriers and extending longitudinally therethru, and formed with longitudinal perforations fitting the stock, said dies being mounted in positions receiving the stock and holding it while they are in alinement with one another at the instant of shearing; the rotary carrier having mounted in it a plurality of such hollow dies in positions successively cooperative with the hollow die in the other carrier; and each of such dies in the rotary carrier being formed with a stock-opening on its side which leads in the direction of rotation of its carrier.

60. A long-stock rotary shearing machine including mechanism continuously feeding such stock longitudinally, two light-weight cooperating tool-carriers both reciprocable a short distance longitudinally relative to the length of sheared sub-lengths of the long stock, and one rotatable transversely; mechanism causing rotation of said rotatable carrier; and mechanism starting the longitudinal movement of both carriers in the direction of stock-movement at substantially the rate of the stock and maintaining at least such rate of the carriers thruout their movement in said direction.

61. A long-stock rotary shearing machine including mechanism continuously feeding such stock longitudinally, two normally stationary cooperating tool-carriers both reciprocable a short distance longitudinally relative to the length of sheared sub-lengths of the long stock, and one rotatable transversely; mechanism driving the rotary carrier; yieldable means resisting longitudinal movements of the carriers in the direction of stock-feed and storing up energy during such carrier movements; and mechanism coordinated with the rotary carrier and its driving mechanism and driving both carriers longitudinally in the direction of stock-feed while the rotary carrier is being rotated, said coordinated driving mechanism causing substantially a rate of longitudinal carrier movement during shearing which is substantially the same as that of the stock-movement and thereafter a slightly increased rate, and then holding the carriers at the end of their longitudinal movement in the direction of stock-feed and preventing return carrier-movement by said energy-storing means until the rotary carrier has moved far enough beyond its shearing position to provide an unobstructed path for the continuously advancing stock.

62. A long-stock rotary shearing machine including mechanism continuously feeding such stock longitudinally, two cooperating tool-carriers reciprocable along the stock-length over a path short relative to the sheared lengths of the long stock; cooperating shearing tools carried thereby; one of said carriers being also rotatable transversely of the stock, and the other carrier having a portion on which the rotatable carrier is mounted as an axis of rotation remote from the line of stock-feed; and mechanism rotating the rotatable carrier and simultaneously reciprocating both the carriers in shearing relation to one another in timed relation to the rate of stock-feed.

63. A long-stock rotary shearing machine including mechanism continuously feeding such stock longitudinally, a longitudinally extending tool-carrier-support; two cooperating tool-carriers supported by said support and both reciprocable along the stock-length over a path short relative to the sheared sub-lengths of the long stock, one of said carriers being also rotatable transversely of the stock, said carrier-support itself being supported in a location parallel to and remote from the line of stock-feed said carriers being mounted centrally on said support; shearing tools mounted alongside one another on said carriers; driving mechanism causing operation of said tool-carriers moving both shearing tools together along the stock and one alongside the other and across the stock and in timed relation with the stock-feed for shearing; and stationary means supporting said driving mechanism.

64. In a machine for shearing long relatively narrow stock, the combination with continuously operated mechanism feeding such stock lengthwise, of a pair of normally stationary cooperating shearing tools; actuating mechanism operating said tools intermittently during the continuous operation of said feeding mechanism; a clutch for said actuating mechanism, a target-control for said actuating mechanism and normally lying in out-of-control position in the path of the van of the unsheared feeding stock and movable thereby into a position controlling the starting of said actuating mechanism for shearing off the stock-van; means supporting the stock-van in the path of stock-feed after movement of the target-control to its said control position; means providing for momentary continued advance of the stock-van and maintenance of the target-control in its operative position, after the stock-van has started moving the target-control and at least until shearing off of the sub-length; and mechanism controlled by the target in its control position and causing movement of the sheared-off stock-van at the desired time out of the path of the moving parent stock and away from the target-control thereby temporarily discontinuing the operation of said control.

JOSEPH H. ROBERTS.